(12) United States Patent
Decker et al.

(10) Patent No.: US 7,917,846 B2
(45) Date of Patent: Mar. 29, 2011

(54) WEB CLIP USING ANCHORING

(75) Inventors: Kevin Decker, San Jose, CA (US); John Sullivan, Pacific Grove, CA (US); David Harrison, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 828 days.

(21) Appl. No.: 11/760,650

(22) Filed: Jun. 8, 2007

(65) Prior Publication Data

US 2008/0307301 A1 Dec. 11, 2008

(51) Int. Cl.
*G06F 17/00* (2006.01)
(52) U.S. Cl. .......................... 715/234; 715/255; 715/277
(58) Field of Classification Search .................. 715/234, 715/255, 277, 237, 176, 181, 167; 713/176, 713/181, 167
See application file for complete search history.

(56) References Cited

U.S. PATENT DOCUMENTS

| | | |
|---|---|---|
| 6,573,915 B1 | 6/2003 | Sivan et al. |
| 6,976,210 B1 | 12/2005 | Silva et al. |
| 2005/0246651 A1 | 11/2005 | Krzanowski |
| 2006/0041589 A1 | 2/2006 | Helfman et al. |
| 2006/0242145 A1 | 10/2006 | Krishnamurthy et al. |
| 2006/0277460 A1 | 12/2006 | Forstall et al. |
| 2007/0266342 A1 | 11/2007 | Chang et al. |
| 2008/0201452 A1 | 8/2008 | Athas et al. |
| 2008/0307308 A1 | 12/2008 | Sullivan et al. |

FOREIGN PATENT DOCUMENTS

| | | |
|---|---|---|
| WO | WO2008/154114 | 12/2008 |
| WO | WO2008/154120 | 12/2008 |

OTHER PUBLICATIONS

International Search Report and Written Opinion of the International Search Authority, PCT/US2008/063764, Oct. 22, 2008, 14 pages.
Lingam et al., "Supporting End-Users in the Creation of Dependable Web Clips," Conference Proceedings—WWW2007/ Track Web Engineering, [Online] May 8, 2007, Banff, Alberta, Canada, pp. 953-962, XP002499026.
Freire et al.,:WebViews: Accessing Personalized Web Content and Services, International World Wide Web Conference, May 1, 2001, pp. 1-11; XP-002362221.
Kowalkiewicz et al., "Towards More Personalized Web: Extraction and Integration of Dynamic Content from the Web," Frontiers of WWW Research and Development—APWEB 2006 Lecture Notes in Computer Science; LNCS, Springer-Verlag Berlin Heidelberg, pp. 668-679.
International Preliminary Report on Patentability in Application No. PCT/US2 008/063764, dated Dec. 11, 2009.
International Preliminary Report on Patentability in Application No. PCT/US2 008/063956, dated Dec. 11, 2009.
International Search Report and Written Opinion of the International Search Authority, PCT Serial No. PCT/US2008/063956, Jul. 22, 2008, 9 pages. Apple Inc.: "Dashboard—Clips and Flicks" [Online] May 25, 2007, pp. 1-3, XP002491369 Retrieved from the Internet: URL:http://web.archive.org/web/20070525170126/www.apple.com/macosx/leopard/dashboard.html>; [retrieved on May 25, 2007].
SnagIt (Version 7.02—Nov. 21, 2003).

*Primary Examiner* — Thu Huynh
(74) *Attorney, Agent, or Firm* — Fish & Richardson P.C.

(57) ABSTRACT

Methods, computer program products, systems and data structures for generating a signature for a portion or portions of a content source are described. The signature can be generated by identifying a portion or portions of a content source, and determining a signature that defines the portion or portions. If the source is updated, the signature can be retrieved and compared to elements in the updated source. If an element in the updated source matches information included in the signature, content corresponding to the matching element is displayed.

20 Claims, 12 Drawing Sheets

WEB CLIP USING ANCHORING

TECHNICAL FIELD

This invention relates selecting content for presentation to users.

BACKGROUND

Existing computer systems allow a user to clip an item of interest, such as a block of text, from a first document into a clipboard. The user may then paste the contents of the clipboard into a second document. If the user becomes aware that the item of interest has been modified in the first document, the user may again clip the now-modified item of interest from the first document, and re-paste the now-modified clipboard portion into the second document.

Common browsers allow a user to select a web page, and to further select an area of interest in the web page for display by scrolling until the area of interest displays in the browser's display window. If the user desires to have the browser display the most current content in the selected area of interest in the web page, the user may manually request a refresh of the web page. After closing the browser, if the user again desires to view the area of interest, the user may launch the browser and repeat the process of selecting the area of interest.

SUMMARY

Systems, apparatus, methods and computer program products are described below for generating a signature for a selected portion of a content source. The signature can be configured to map previously clipped content to a refreshed location. A signature may include physical information or DOM information about a selected structural element, such as, without limitation, tag name and attribute of the element, size of the element, number of parent and child nodes of the element, types and tag names of the parent and child nodes of the element, number of sibling nodes, types and tag names of the sibling nodes, and properties (e.g., class, ID, etc.) of the element and parent and child nodes of the element.

In one aspect, a method is provided that includes identifying a portion of a structure of a document, determining a signature associated with the portion, and storing the signature.

One or more implementations can optionally include one or more of the following features. The method can include determining one or more key elements in the portion, where determining a signature includes determining a signature that defines the key elements. The method can include identifying one or more structural elements in the structure, and determining a signature that defines one or more of the identified elements. The method can include determining a boundary associated with each structural element and selecting a structural element that meets a predetermined boundary criteria. The method can include determining a spatial extent of a boundary associated with each structural element and selecting a structural element that meets a predetermined spatial extent criteria. The method can include determining a visible region associated with each structural element and selecting a structural element that meets a predetermined visibility criteria. The method can include receiving a request to display the portion of the document; retrieving the signature; retrieving an updated version of the document; determining a portion of the updated version of the document that corresponds to the signature; and presenting the portion from the updated version of the document in a user interface. The signature can include physical information or document object model information associated with a portion of the document.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Clipping Overview

Figure 1:
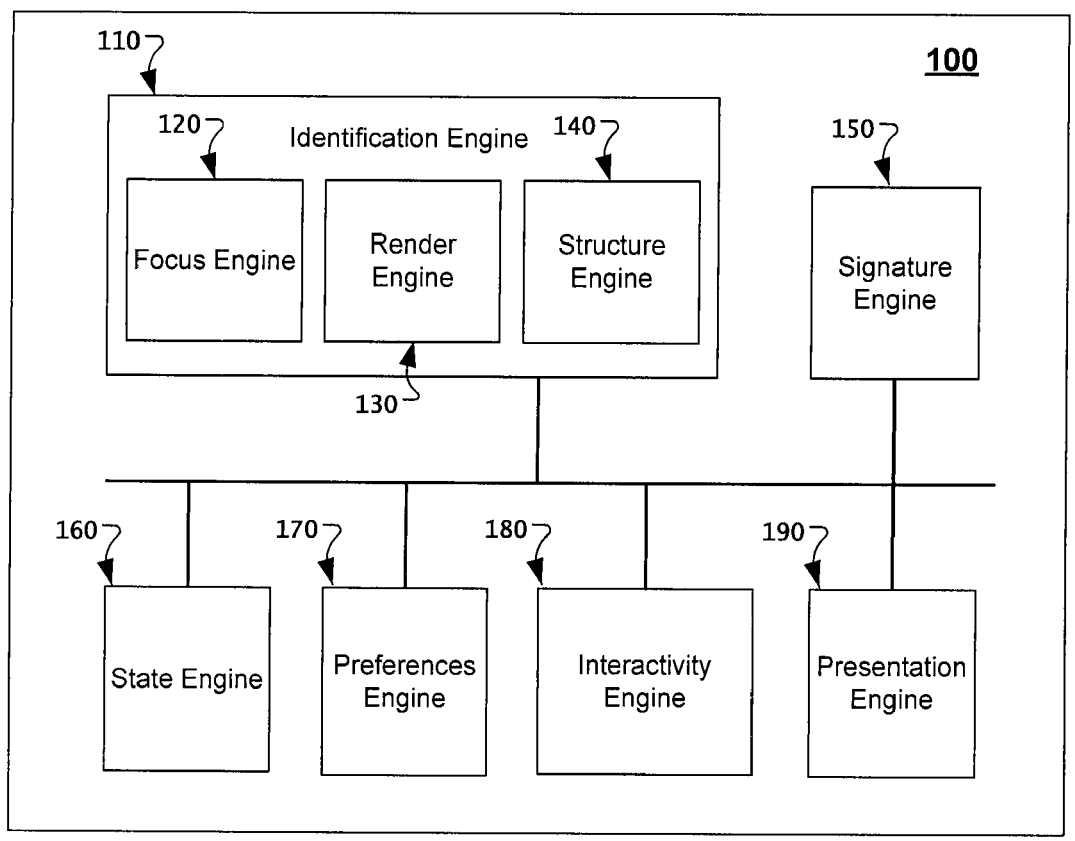
FIG. 1 is a block diagram showing an example clipping application and components thereof.

A clipping process creates a clipping of content associated with an area of interest from one or more content sources and presents the clipping in an output device (e.g., a display) using a user interface. The clipping process generally begins with identifying a content source (e.g., web page), and determining an area of interest (e.g., an article) in the identified content source. The content source can be rendered and presented to the user in a user interface so that the user can navigate to or otherwise select the area of interest. The user interface can be shaped (or reshaped) or sized (or resized), and the clipping displayed in the user interface can be manually position (or repositioned) so that only the area of interest is displayed and content specified in the area is clipped.

In various implementations, the user interface of the clipping is referred to as a clipview, a webview (e.g., clippings provided from a web page), a docview (clippings provided from a datastore) or other "X" views. The user interface can include a view portion for displaying the clipping (or presenting audio content) and an optional frame portion for framing the clipping (e.g., with a border frame). The user interface also can include one or more additional portions for presenting information such as, for example, preference settings and an identifier of the content source (e.g., URL). Further detail regarding the user interface may be found, for example, in co-pending U.S. patent application Ser. No. 10/877,968, entitled "Unified Interest Layer For User Interface," filed Jun. 25, 2004; U.S. patent application Ser. No. 11/145,560, entitled "WEBVIEW APPLICATIONS", filed Jun. 3, 2005; and U.S. patent application Ser. No. 11/145,023, entitled "CLIPVIEW APPLICATIONS," filed Jun. 3, 2005, each of these applications is incorporated herein by reference in its entirety.

Once clipping is complete, the user interface can be displayed as a widget. A widget can be displayed in a dashboard or desktop environment, and generally includes software accessories for performing useful, commonly used functions. In general, widgets may provide access to any of a large variety of items, such as, for example, applications, resources, commands, tools, folders, documents, and utilities. Examples of widgets include, without limitation, a calendar, a calculator, and address book, a package tracker, a weather module, a clipview (i.e., presentation of clipped content in a view) or the like.

Refresh Overview

A widget can display a static clipping. A static clipping depicts captured content associated with an area of interest, and reflects the area of interest at the time the clipping was defined, allowing the user to instantly capture and store content. For example, if a static clipping displays a weather forecast for Monday, then the static clipping will continue to show the weather forecast for Monday, even if the content at the source associated with the clipping is updated to reflect a new weather forecast for Tuesday.

Alternatively, clipping in the widget may be refreshed at a user-specified interval or automatically, and the widget may be closed and reopened displaying an updated content. A refreshable clipping can initially depict the content last received from a content source (e.g., when the clipping was previously presented), while the source is accessed to identify any possible update.

In some implementations, content of a clipping may be refreshed by receiving reloads/updates pushed automatically from one or more content sources. Content sources may transmit a notification when an update is available, or when new content is received. Notifications and reloads/updates may be provided using, for example, a publish-and-subscribe system. For example, a clipping may be defined to include a subscription definition (e.g., as part of the selection definition) that supports receipt of content from a subscription service. In this paradigm, a clipping may be configured to subscribe to a content source and updates to the underlying material are then provided in accordance with the subscription source and the attending subscription definition (e.g., in accordance with the terms of an underlying subscription agreement). Accordingly, the content displayed can be provided to, and accepted in a clipping by web or net based (or otherwise provided) updates from the subscription service.

Alternatively, a refresh request may be, for example, received directly from a user, or generated as a result of a refresh timer set to initiate refresh requests at a particular frequency. The refresh timer may be set based on refresh rate preferences, to query a user for refresh preferences, to process refresh updates pushed or required by the source sites or otherwise control refresh operations as discussed below (e.g., for live or automatic updates).

A refresh request also may be received in response to user's selection of a refresh strategy. Refresh strategies can include making the clipping static or refreshable. Other refresh strategies are possible. For example, a clipping can be refreshed when the clipping is presented, but only if the content has not been refreshed within a particular time period.

A refresh request also may be received, generated or required in response to an indication from a content source or application that an update is available, required or otherwise necessitated (e.g., live or automatic updates). A refresh request also may be received in response to receiving an update (rather than merely a notification of an available update) pushed from a content source.

In some implementations, a script may be created for performing a refresh to update content. The script may include, for example, an identifier of the content source (e.g. URL) and an identifier of a portion of the content source or an area of interest (e.g. an (x,y) offset from a frame boundary). More complex scripts also may include identifiers for a login page, and identifiers for navigating to an area of interest after a successful login.

In some implementations, refresh rate preferences may be set to regulate a frequency of the refresh. For example, refresh rate preferences may include "continuous," "once per minute," "once every five minutes," "intermittent," "selectively," "on command," "never," "automatically," "manually," "live", "as provided" or otherwise. Refresh rate preferences also may allow a user to select a particular day and time, which may be useful in refreshing a clipping that gets updated at the content source at, for example, eight a.m. every Monday, or for refreshing a clipping of a live video segment by recording the video segment (or a portion of it) when the segment initially airs. A list of the previous content sources and areas of interest that have been clipped also may be stored to allow a user to select one of these historical selections as the current selection for the clipping.

Generally, to perform a refresh, information used to perform the refresh is accessed. For example, information may include, without limitation, identifier of a content source (e.g., URL), identifier of a particular portion of the content source or an area of interest (e.g., position information), and identifier for a login page. Content from the area of interest of the content source can then be retrieved and copied to a transitory memory (e.g., a random access memory), or to a non-transitory memory (e.g., a hard disk). The presentation of a clipping is subsequently refreshed by presenting the copied content.

Typically, a refresh accesses a previously selected area of interest in which old content was captured, retrieves new content from the selected area of interest, replaces old content with new content, and reloads and displays the new content in a clipping. For example, if a clipping has clipped an area of a web page in which a current weather report for the city of San Francisco is displayed, the clipping will continue to access the same area to retrieve updated weather report.

When updating a content source, user's targeted content in the selected area of interest as defined by a clipping may be shifted to a new location or entirely removed to accommodate the additions of new formation and deletions of out-of-date materials. Using the weather report example discussed above, during an update, the weather report for the city of San Francisco may be shifted to another area within the web page to accommodate the additions of weather reports for neighboring cities (e.g., New York, Chicago or Los Angeles). As another example, an article titled "Gas Price Rises" might be displayed at the top of a web page. After updating the web page, a new advertising banner (e.g., "Buy and Sell at EBay.com") was added to the top of the web page, causing the "Gas Price Rises" article to shift to a different area within the web page.

However, a clipping, as originally defined, is bound to a selected area of interest. Thus, any shift of the content elements as a result of an update, including those in the selected area, also would cause the content defined in the clipping to change. For example, a user may see a different article in a clipping after refresh/update, rather than the original article captured at the time the clipping was created, because the original content has been placed in a different area (e.g., to a different section within a web page).

Thus, it may be desirable to track the new location of targeted content so that the targeted content can continue to be displayed in the clipping. For example, if a user has clipped a news article, the user will no longer need to manually adjust the clipping and navigate to a new location where the article now resides to view the article when the old location of the news article has been altered (e.g., due to the additions of editors' comments).

Content elements in a web page can change in size or position during an update or refresh. For example, an online article may change in size (e.g., to include additional text or images), or be placed in a different area within the web page. However, a clipping cannot accommodate to such change, as the viewing area of the clipping is generally fixed. As an example, elements that extend over the viewing area as originally specified would be excluded from the clipping. To overcome such a limitation, a clipping signature can be used so that a same portion of the web page can continue to be displayed in the clipping, regardless of any change in size or position of the element(s) of interest in that portion of the web page.

As will be discussed in greater detail below, a signature can be created for a selected portion (i.e., an area of interest) of a content source. A signature may include, without limitation, physical information associated with an area of interest and content contained within the area (e.g., a frame or border of the area of interest which includes the (x,y) coordinates or size and dimension of the area of interest, structure or layout of the content, and visibility of the area with respect to a web clip, etc.).

As an example, a user may clip a portion of a content source, and a signature may be generated based on coordinates of the portion being clipped relative to other content within the content source. The signature may be, for example, serialized and stored, and a widget used for displaying a clipping may be generated that retrieves and loads the signature, obtains the coordinates of the portion from the signature, and access the content source to locate the content described by the coordinates. The accessed information may be used as a clip specification to the newly created widget (e.g., when the widget is created for the first time) so that the widget may load the clipping with the appropriate dimensions as specified by the user.

A signature also may include other information, such as, without limitation, structural information (e.g., "the third paragraph in the fourth section" or "the first image in the third row of the second table"), content-based information (e.g., "the element with an ID of 'latest-results'"), geometric information (e.g., size and position of a clipping relative to a top-left corner of a web page, or relative to other structural or content-based data), and presentation information (e.g., font size, font color, font type) of the content.

In addition to physical information, a signature also may include DOM information about a selected structural element, such as, without limitation, tag name and attribute of the element, size of the element, number of parent and child nodes of the element, types and tag names of the parent and child nodes of the element, number of sibling nodes, types and tag names of the sibling nodes, and properties (e.g., class, ID, etc.) of the element and parent and child nodes of the element.

After updating a source, the signature can be retrieved, for example, to track the new location of a desired element in the updated source, or to identify and accommodate the desired element even if the location and/or size of desired element has been modified.

Clipping Application Components

Referring to FIG. 1, components of a clipping application 100 are shown. Clipping application 100 provides functionality for clipping content and presenting the clipped content or clippings to a user. Clippings produced by clipping application 100 can be implemented in some instantiations as simplified browser screens that omit conventional interface features such as menu bars, window frame, and the like.

As shown, clipping application 100 includes an identification engine 110 that includes a focus engine 120 for identifying the content to be clipped, a render engine 130 for rendering content and a structure engine 140 for identifying elements that are structural. Clipping application 100 further includes a signature engine 150 for generating one or more signatures configured to map previously clipped content to a refreshed location, a state engine 160 for enabling a refresh of the clipped content, a preferences engine 170 for setting preferences associated with, for example, the display and configuration of the clipped content, an interactivity engine 180 for processing interactions between a user and the clipped content, and a presentation engine 190 for presenting the clipped content to a user.

Engines 110-190 can be communicatively coupled to one or more of each other. Though the engines identified above are described as being separate or distinct, one or more of the engines may be combined in a single process or routine. The functional description provided herein including separation of responsibility for distinct functions is exemplary. Other groupings or other divisions of functional responsibilities can be made as necessary or in accordance with design preferences.

Focus Engine

Focus engine 120 may be used to initially identify, possibly with the assistance of the user, content to be clipped. Such an identification may include accepting input from a user or from another application, and providing assistance or suggestions to a user or application. Focus engine 120 also may be used to access a previously selected area of interest during a refresh of clipped content. Identifying content or accessing a previously identified area of interest may include numerous operations which can be performed, in whole or in part, by focus engine 120, or may be performed by another module such as one of engines 110 or 130-190. Focus engine 120 may perform various operations associated with identifying relevant content such as (1) identifying a content source, (2) enabling a view to be presented, such as a window, that displays the content source, (3) enabling the view to be shaped (or reshaped), sized (or resized) and positioned (or repositioned), and (4) enabling the content source(s) to be repositioned within the view to select an area of interest.

Focus engine 120 may be initialized in various ways, including, for example, by a user selecting clipping application 100 to clip content, by receiving a user's acceptance of a prompt to create a clipping, or automatically. An automatic initialization may occur, for example, if a user displays in an application content that includes a pre-defined view, in which case the application may automatically initialize focus engine 120 to create the pre-defined view.

In clipping content from a content source, focus engine 120 also may obtain information about the configuration of the application from which the content was clipped. Such configuration information may be required to identify the area of interest within the content source. For example, when a web page is accessed from a browser, the configuration of the browser (e.g. size of the browser window) may affect how content from the web page is actually displayed (e.g., page flow, line wrap, etc.), and therefore which content the user desires to have clipped.

Render Engine

Render engine 130 may be used to render content that is to be presented to a user in a clipping or during a clip setup process. Render engine 130 may, alternatively, be placed in whole or in part outside of identification engine 110. Such alternate locations include, for example, another engine, such as, for example, presentation engine 190 which is discussed below, and a separate stand-alone application that renders content.

Implementations may render one or more entire content sources or only a portion of one or more of the content sources, such as, for example, the area of interest. As discussed above, an area of interest can represent a contiguous area of a content source, such as a frame or the like, or can be an accumulation of two or more non-contiguous or unrelated pieces of content from a single or multiple sources. In particular implementations, an entire web page (e.g., one form of a content source) is rendered, and only the area of interest is actually presented.

Rendering the whole web page allows identification engine 110 to locate structural markers such as a frame that includes part of the area of interest or an (x,y) location coordinate with reference to a known origin (e.g., creating reference data). Such structural markers, in a web page or other content, may be useful, for example, in identifying the area of interest, particularly during a refresh/update after the content source has been updated and the area of interest may have moved. Thus, a selected area of interest may be tracked. The entire rendered page, or other content source, may be stored (e.g., in a transitory or non-transitory memory) and referenced to provide a frame of reference in determining the selected area of interest during a refresh, for example.

In various implementations, render engine 130 renders content that has been identified using focus engine 120. Identification engine 110 typically is capable of processing a variety of different content formats, navigating within those formats, and rendering those formats. Examples include hypertext markup language ("HTML"); formats of common word processing, spreadsheet, database, presentation, and other business applications; and common image and video formats.

Structure Engine

Structure engine 140 can be used to parse and evaluate a content source, and the result of which can be used to identify one or more structural elements (e.g., a column of text, a paragraph, a table, a chart and the like) within the content source. For example, the structure engine 140 can parse a web page (e.g., one form of a content source) to determine one or more document sections, tables, graphs, charts, and images as well as their respective spatial locations in the content source.

Elements in the content source can be expressed in a document object model (DOM), a description of how a document (e.g., HTML or XML document) is represented in an object-oriented fashion. DOM provides an application programming interface to access and modify the content, structure and style of the document through the use of a hierarchy of elements, which contains elements that are structural and elements that are not structural. In some implementations, the structure engine 140 can utilize the DOM to determine which of the elements are structural and which structural elements can potentially be considered for signature generation, as will be discussed in greater detail below with respect to FIG. 2B.

State Engine

State engine 160 may be used to store information (e.g., metadata) needed to refresh clipped content and implement a refresh strategy. Such information is referred to as state information and may include, for example, a selection definition including an identifier of the content source as well as additional navigation information that may be needed to access the content source, and one or more identifiers associated with the selected area of interest within the content source(s). The additional navigation information may include, for example, login information and passwords (e.g., to allow for authentication of a user or subscription verification), permissions (e.g., permissions required of users to access or view content that is to be included in a given clipping), and may include a script for sequencing such information. State engine 160 also may be used to set refresh timers discussed earlier for executing a refresh request.

In some implementations, the state engine 160 may store location information that is, for example, physical or logical. Physical location information includes, for example, an (x, y) offset of an area of interest within a content source, including timing information (e.g., number of frames from a source). Logical location information includes, for example, a URL of a web page, HTML tags in a web page that may identify a table or other information, or a cell number in a spreadsheet. State information may include information identifying the type of content being clipped, and the format of the content being clipped.

Signature Engine

The signature engine 150 can generate one or more signatures. A signature may include, for example, physical information associated with an area of interest and content contained within the area (e.g., a frame or border that includes the area of interest, (x,y) coordinates of the area of interest, structure or layout of the content, size or dimension of the area of interest and visibility of the area with respect to a web clip, etc.). A signature can define a portion or portions of a content source. The portion can be, for example, a monthly editorial article, live box score, weekly horoscope, annual stock report and daily weather forecast. Each signature can, without limitation, store information associated with the portion (e.g., text, images, borders, etc.), track a new location of the portion in an updated source, and map an associated clipping to display the portion at the new location. Each signature also may include information, such as, without limitation, structural information, content-based information, geometric information, and presentation information associated with the content.

In some implementations, the signature engine 150 can automatically determine a portion that is suitable for signature generation. In another implementations, a user can manually select a portion of the source for which a signature is to be generated (e.g., by navigating to an area of interest in the content source).

A portion for which signature is desired can be determined by first identifying one or more structural elements in the source. A structural element can be, for example, a document section, table, graph, chart or image. As will be discussed in greater detail with respect to FIG. 2B, in one implementation, to yield a structural element that best fits a particular signature profile, one or more predetermined signature criteria can be implemented to isolate and remove irrelevant materials, extraneous content and unrelated elements. Once a best element is recognized, the signature engine 150 can generate a signature that defines the best element and store the generated signature for future retrieval. While reference is made to identifying one best structural element, plural structural elements and data associated thereof can be included in a signature.

An updated source can cause content in the original source to shift (e.g., to a different location). Thus, to be able to map content displayed in a clipping to a new location shown in the updated source, the signature engine 150 can retrieve and compare the stored signature against one or more elements in the updated source to determine one or more portions of the updated source that corresponds to the signature. Subsequently, the portion of the updated source is mapped and presented to the user.

Preferences Engine

Preferences engine 170 may be used to query a user for preferences during the process of creating a clipping. Preferences engine 170 also may be used to set preferences to default values, to modify preferences that have already been set, and to present the preference selections to a user. Preferences may relate to, for example, a refresh rate, an option of muting sound from the clipping, a volume setting for a clipping, a setting indicating whether a clipping will be interactive, a naming preference to allow for the renaming of a current clipping, a redefinition setting that allows the user to adjust (e.g., change) the area of interest (e.g., reinitialize the focus engine to select a new area of interest to be presented in a clip view), and function (e.g. filter) settings. Preferences also may provide other options, such as, for example, listing a history of previous content sources that have been clipped, a history of changes to a current clipping (e.g., the changes that have been made over time to a specific clipping thus allowing a user to select one for the current clipping) and view preferences. View preferences define characteristics (e.g., the size, shape, controls, control placement, etc. of the viewer used to display the content) for the display of the portions of content (e.g., by the presentation engine). Some or all of the preferences can include default settings or be configurable by a user.

Interactivity Engine

Interactivity engine 180 may process interactions between a user and clipped content by, for example, storing information describing the various types of interactive content being presented in a clipping. Interactivity engine 180 may use such stored information to determine what action is desired in response to a user's interaction with clipped content, and to perform the desired action. For example, interactivity engine 180 may (1) receive an indication that a user has clicked on a hyperlink displayed in clipped content, (2) determine that a new web page should be accessed, and (3) initiate and facilitate a request and display of a new requested page. As another example, interactivity engine 150 may (1) receive an indication that a user has entered data in a clipped form, (2) determine that the data should be displayed in the clipped form and submitted to a central database, (3) determine further that the next page of the form should be presented to the user in the clipping, and (4) initiate and facilitate the desired display, submission, and presentation. As another example, interactivity engine 150 may (1) receive an indication that a user has indicated a desire to interact with a presented document, and (2) launch an associated application or portion of an application to allow for a full or partial interaction with the document. Other interactions are possible.

Presentation Engine

Presentation engine 190 may present clipped content to a user by, for example, creating and displaying a user interface on a computer monitor, using render engine 130 to render the clipped content, and presenting the rendered content in a user interface. Presentation engine 190 may include an interface to a variety of different presentation devices for presenting corresponding clipped content. For example, (1) clipped web pages, documents, and images may be presented using a display (e.g., a computer monitor or other display device), (2) clipped sound recordings may be presented using a speaker, and a computer monitor may also provide a user interface to the sound recording, and (3) clipped video or web pages having both visual information and sound may be presented using both a display and a speaker. Presentation engine 190 may include other components, such as, for example, an animation engine (not shown) for use in creating and displaying a user interface with various visual effects such as three-dimensional rotation.

Example Processes For Generating Signature

Figure 2A:
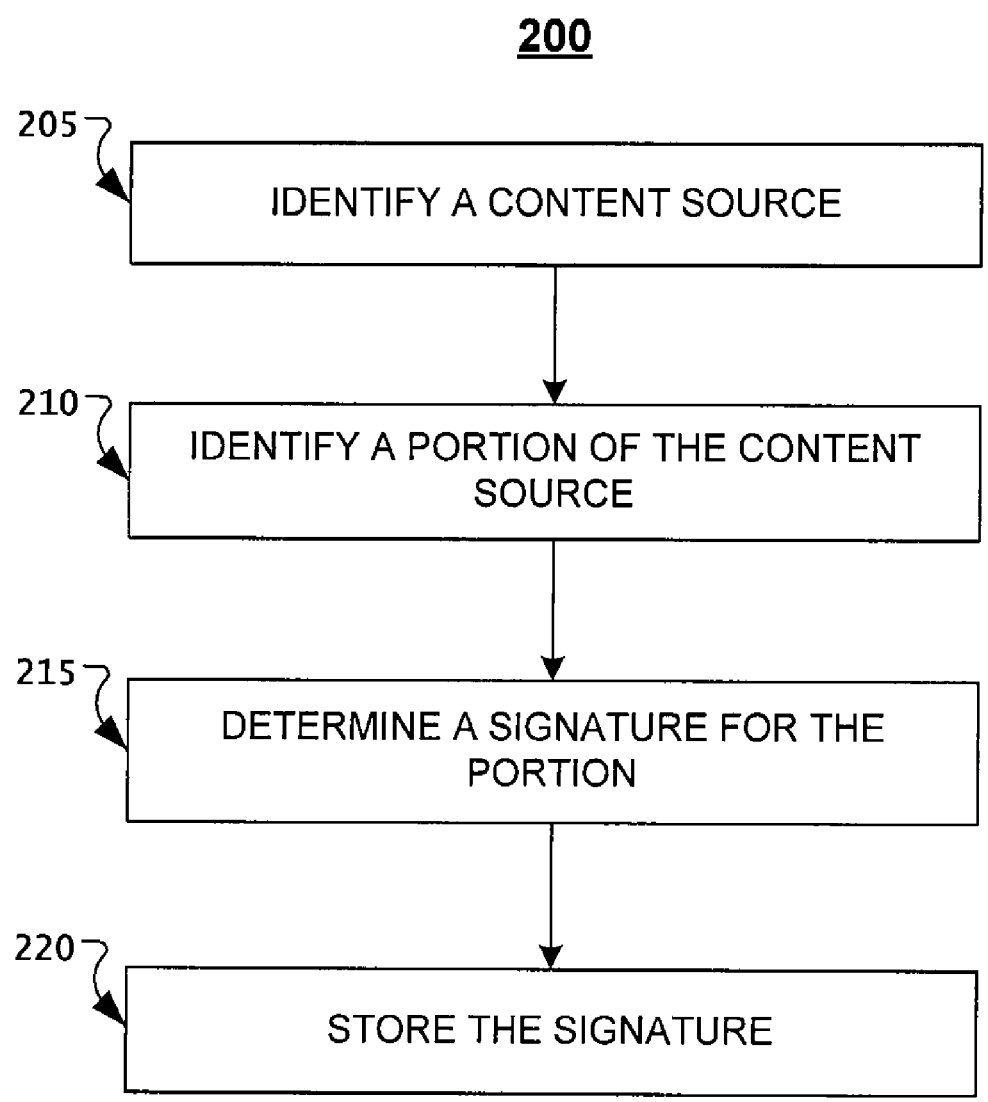
FIG. 2A is a flow chart showing an example process for creating a signature.

FIG.2A shows an example process 200 that can be used to create a signature. Process 200 may be performed, at least in part, for example, by clipping application 100 running on a system 510 (see, FIG. 5).

Process 200 includes identifying a content source (205) and identifying a portion of the content source (210). In some implementations, identifying a content source can include identifying a layout structure of the content source, and identifying a portion of the content source can include identifying one or more areas of interest in the content source for which a signature is desired.

A content source can be, without limitation, a web page, a file containing images, text, graphics, forms, music, and videos. Content source can also include a document having any of a variety of formats, files, pages and media, an application, a presentation device or inputs from hardware devices (e.g., digital camera, video camera, web cam, scanner, microphone, etc.).

Identifying a portion of a content source may be performed by a user using a cursor. The cursor can be a common pointer as controlled by a standard mouse, trackball, keyboard pointer, touch screen or other user manageable devices or navigation tools. A user may navigate around, for example, a web page using the cursor and/or a combination of keystrokes. In some implementations, when the cursor is hovered upon an element identified as a structural element (as will be described in greater detail below), a visual effect is triggered around the structural element. For example, when a cursor passes over an element identified as structural, the element displays itself differently to convey its selectability to the user. Further detail regarding structural selection can be found in U.S. Co-Pending application Ser. No. 11/760,658, the disclosure of which is incorporated herein by reference in its entirety.

Once a portion of the content source is identified, a signature for the identified portion can be determined (215) and subsequently generated. In some implementations, determining a signature can include locating structural markers such as a frame that includes the identified portion or an (x,y) coordinates with reference to a known origin (e.g., creating reference data). Such structural markers, in a web page or other content, may be useful, for example, in identifying the location of the identified portion, particularly during a refresh or update after the content source has been updated and the identified portion may have moved. Thus, the identified portion can be tracked by retrieving the structural markers.

The generated signature can be stored (220) in a transitory memory such as local cache or random access memory ("RAM"), or in a non-transitory memory such as a hard disk. The entire rendered page and other content source(s) also can be stored (e.g., in a transitory or non-transitory memory) and referenced to provide a frame of reference, for example, in determining the identified portion during a refresh. In some implementations, the entire rendered page is stored non-transitorily (e.g. on a hard disk) to provide a frame of reference for the initial presentation and for all refresh operations, and content that is accessed and presented in a refresh is not stored non-transitorily.

Identifying a portion of content source can be performed manually by a user. For example, a user can manually select a web page using a web browser, and navigate to a desired portion of the web page (e.g., an article). Alternatively, one or more engines 110-190 of the clipping application 100 may be combined in a single process or routine to automatically identify, on behalf of the user, the portion of the content source for which a signature is desired.

Figure 2B:
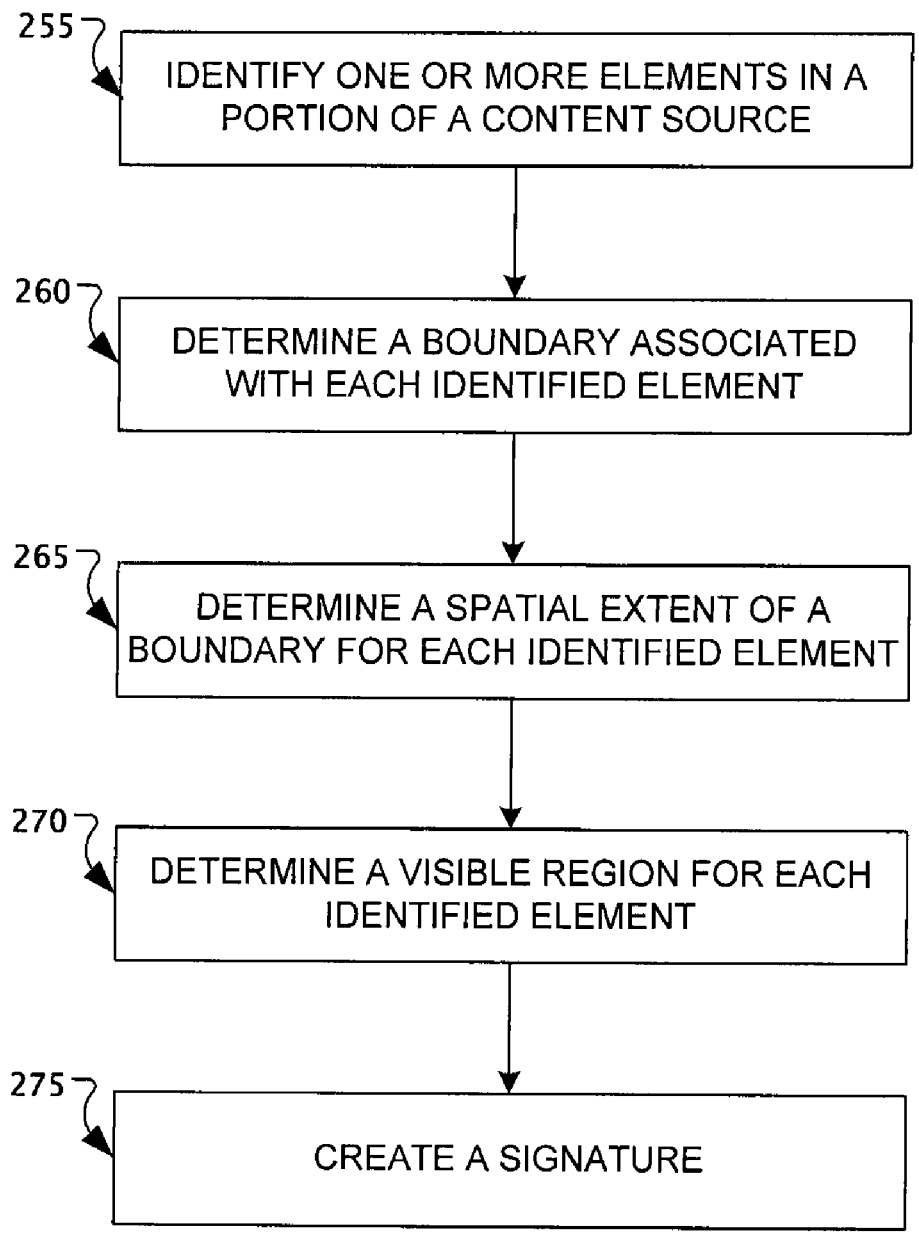
FIG. 2B is a flow chart showing an example process that implements one or more criteria for aiding an identification of a desired element for which a signature is to be generated.

In some implementations, one or more criteria can be used to aid the identification of a desired element for which a signature is to be generated. Referring to FIG. 2B, identifying a portion of the content source can include identifying one or more elements in the content source (255). The one or more elements may be identified based on one or more predetermined criteria that indicate their desirability and suitability for signature. The predetermined criteria may include, without limitations, general popularity, user's past behavior, and marketing desires. The predetermined criteria also may be based on a frequency with which a user visits certain content, or visits certain areas of interest within the content, or a frequency of an update for a particular element.

In another implementations, identifying one or more elements in the content source can include identifying one or more elements that indicate the presence of a structure. The structure may include, without limitations, a document section, table, graph, chart or image. The structure engine 140 can perform, for example, structure identification or other mechanism to evaluate every element in the content source and identify one or more elements that are structural.

The signature engine 150 can utilize the evaluation results to isolate structural elements among the identified elements that do not meet one or more signature criteria and to select one or more elements (e.g., a best element or multiple elements that are equally suitable) for signature generation. As an example, the structure engine 140 can parse a content source to identify structural elements such as, without limitation, monthly editorial articles, live box scores, weekly horoscopes, annual stock reports and daily weather forecasts. Based on a visibility criteria, the signature engine 150 may select a largest visible element, such as, an editorial article, and generate a signature that defines the editorial article.

To determine elements that are structural, in some implementations, the structure engine 140 can retrieve structural information from a document object model (DOM) associated with the identified content source. In general, the DOM is a platform-neutral and language neutral interface that permits scripting languages (e.g., JavaScript) to dynamically access and instantly update the content, structure, and style of a document (e.g., appearance and location of content). The DOM is based on an object structure that closely resembles the structure of documents it models, and includes a logical model that can be implemented in any convenient manner (e.g., a tree structure).

In the DOM, documents are modeled using objects (e.g., text objects, text style objects, image objects, etc.), and the model encompasses not only the structure of a document, but also the behavior of the document and the objects of which it is composed. As an object model, the DOM identifies the interfaces and objects used to represent and manipulate a document, and the semantics of these interfaces and objects, including both behavior and attributes.

The DOM generally employs a hierarchical topology (e.g., a hierarchy of branches and nodes) to specify the relationships and collaborations among these interfaces and objects, and to access and manipulate a document (e.g., HTML or XML document) based on the specified relationships and collaborations. For example, the DOM can categorize elements in a document (e.g., text, images and links) as objects, and specify associated attributes and properties for each categorized object. In a tree structure, the DOM uses its tree nodes (e.g., root nodes, branches nodes and leaf nodes) to represent such objects, and groups each node in one or more subtrees. Each node has an individual function (e.g., tag and attribute) and identity (e.g., class and ID) to characterize the content, structure and style of a document.

With the hierarchical topology, the DOM can specify family relationships between the nodes (e.g., a parent node and a child node). For example, an HTML document generally contains a <html> tag, which includes a <head> tag followed by a <title> tag. In DOM, the <html> node can be expressed as a parent node of the <head> node, and the <title> node can be expressed as a child node of the <head> node. Each node can have one or more descendants (e.g., where descendants are nodes that are children of a node or children of those children), and one or more ancestors (e.g., where ancestors are parents of a node, or parents of these parents). Two nodes can be considered as siblings if the nodes share a same parent.

With the DOM, a document can be built, and elements and content associated with the document can be manipulated by adding, modifying and deleting one or more nodes within a hierarchical arrangement. Such a hierarchical arrangement of nodes also provides a framework for constructing a data structure that is particularly useful for identifying suitable structural element(s) for signature consideration. For example, the structure engine 140 can traverse through a DOM and analyze, for example, the tag, attribute, class and ID of each node to understand the overall layout structure of a document, and to extract one or more nodes that express condition(s) of a structure (e.g., a "title" node, an "image" node and the like). Based on the extracted nodes, structural elements can be identified, and the signature engine 150 can subsequently select, in one implementation, a best structural element among the identified elements and generate a signature that defines this structural element.

In some implementations, in addition to physical information, a signature to be created also may include DOM information about the selected structural element, such as, without limitation, tag name and attribute of the element, size of the element, number of parent and child nodes of the element, types and tag names of the parent and child nodes of the element, number of sibling nodes, types and tag names of the sibling nodes, and properties (e.g., class, ID, etc.) of the element and parent and child nodes of the element.

In certain implementations in which multiple structural elements are identified (e.g., a web page that displays multiple articles or text columns), it may be necessary to recognize elements that are not of interest and classify elements that contain superfluous information so as to obtain a matching element(s) that is(are) best suited for signature generation. In some implementations, process 250 includes determining a boundary of each identified element (260) as one way to obtain such a matching element. Operation 260 can be performed to determine a respective boundary for each element, and elements whose boundaries do not meet a predetermined boundary criteria can be omitted for signature consideration. In some implementations, determining a boundary can include determining a border, margin or perimeter having, for example, horizontal and vertical edges (e.g., a bounding box) of the element's visual representation with respect to boundaries of other structural elements. In another implementations, determining whether a boundary meets a predetermined criteria can be based on whether the boundary meets, for example, a particular shape or profile. In yet another implementations, elements that do not have a boundary (e.g., standalone text) will be removed from signature consideration. The process steps of process 250 can be executed by the signature engine 150 or by other components of the clipping application 100.

Process 250 also includes determining a spatial extent of a boundary (265). The spatial extent of the boundary can be based on, for example, (x,y) coordinates of or area occupied by an associated element, or structural markers that indicate the spatial dimension (e.g., position, height and width) of the element. In some implementations, to expedite the identification process to locate a best matching element for signature generation, determining a spatial extent can include determining whether a spatial extent satisfies a predetermined dimension. For example, elements whose boundaries are greater or less than a particular size can be omitted from signature consideration. In another implementations, boundaries between the elements can be compared, and elements whose boundaries are smaller or larger than those of other elements can be omitted from signature generation.

In some implementations, description of the (x,y) coordinates of each boundary can be identified by parsing an associated DOM tree and applying a topological analysis on the DOM tree. For example, properties of each node in the DOM tree can be evaluated to extract location information based on such properties.

Process 250 further includes determining a visible region within a selected area of interest for each identified element (270). The visible region with respect to a clip presenting content of the selected area of interest may be determined, for example, by traversing through the DOM. The hierarchical arrangement of a DOM tree may allow a "quick rejection" test to be performed where a node of the DOM may be "pruned" if an associated element is outside a selected area of interest. For example, if a particular element is deemed to be entirely outside the area of interest, the element is removed from signature consideration.

In some cases, only a portion of an element is visible within the area of interest. Thus, in some implementations, determining a visible region for each identified element can include determining a portion of the visible region that is within a selected area of interest. In these implementations, if the portion of an element is less than a predetermined visible size, then a signature will not be created for the element or the element will not be included in the signature definition.

A weighting system optionally may be implemented which takes into the consideration of the results of each operation 260-270 and scores each element using different weighted values to determine a best matching element. For example, the weighting system may assign weighted values to each identified element based on the results of each operation 260-270. Each operation can be given a rank of relevance and importance, and the weighting system can generate an appropriate weighted value consistent with the given relevance and importance to determine a best matching element. One example of assigning weighted values may assume that a boundary size is less important than visibility, so that an element with a larger visible region would receive a higher weight than another element with a larger boundary size. As another example, elements that meet a predetermined boundary size are weighted more heavily than elements that do not.

The weighting system also can assign a spectrum of weighted values to each element that meets a particular threshold or range. For example, if an element has a 90% visibility within a clipping, then the element can be given a weight value of 0.9. Similarly, if an element has a 10% visibility within a clipping, then the element can be given a weight value of 0.1. As another example, an element having a boundary size of 1280×1024 pixels can be given a higher weighted value than an element having a boundary size of 640×480 pixels. Those skilled in the art will recognize that other ranking or weighting systems also may be employed without departing from the scope of the subject matter discussed herein.

Based on the weighted values, a score can be generated for each identified element by summing the weighted values for each operation. A matching element is then determined when a particular element receives a highest score. A signature that defines the matching element(s) is(are) subsequently created (275). The signature may include, without limitation, physical information associated with an area of interest and content contained within the area (e.g., a frame or border that includes the area of interest, (x,y) coordinates of the area of interest, structure or layout of the content, size or dimension of the area of interest and visibility of the area with respect to a web clip, etc.). The signature also may include a portion or portions of the DOM containing correlated nodes and subtrees that characterize the content, structure and style of the matching element(s).

In some implementations, operations 260-270 may be performed in the order listed, in parallel (e.g., by the same or a different process, substantially or otherwise non-serially), or in reverse order to achieve the same result. In another implementations, operations 265-270 may be performed out of the order shown. The order in which the operations are performed may depend, at least in part, on what entity performs the method. For example, after structural elements are identified, process 250 may determine a spatial extent of each element (265) first and subsequently determine a visible region (270) and boundary associated with each element (260). As another example, process 250 may sequentially determine a visible region for each identified element (270), determine a boundary associated with each identified element (265) (or only those that are displayed) and determine a spatial extent of the boundary (265). Operations 255-275 may be performed by different engines (e.g., signature engine, structure engine, and render engine).

In some implementations, one or more operations 260-270 may be omitted. For example, operations 265 and 270 can be performed without operation 260. In another implementations, operations 260 and 270 can be performed without operation 265. In yet another implementations, operations 260 and 265 can be performed without operation 270.

Example Processes For Locating Content Using Signature

A refresh request may be, for example, received directly from a user, generated as a result of a timer set to initiate refresh requests at a particular frequency, or required in response to an indication from a content source or application that an update is available, required or otherwise necessitated (e.g., live or automatic updates). A refresh request also may be received in response to receiving an update (rather than merely a notification of an available update) pushed from a content source.

A refresh process can include accessing information used to perform a refresh (e.g., by accessing the state engine 160). The refresh process then accesses content from a selected area of interest, typically, using the accessed information, and optionally copies the content from the area of interest. The refresh process then refreshes the presentation of a clipping by presenting the copied content.

Typically, a refresh will replace previously clipped and presented content associated with an area of interest with newly accessed content from the same area of interest. Due to the addition, modification or deletion of content materials, a web clip might no longer display the targeted content, because the clipping was originally defined to target the selected area of interest, rather than the content itself. By retrieving a signature that corresponds to a targeted content and comparing the signature with refreshed content in the web clip, a new location of the targeted content can be, for example, tracked to allow the web clip to continuously display the targeted content.

Figure 3A:
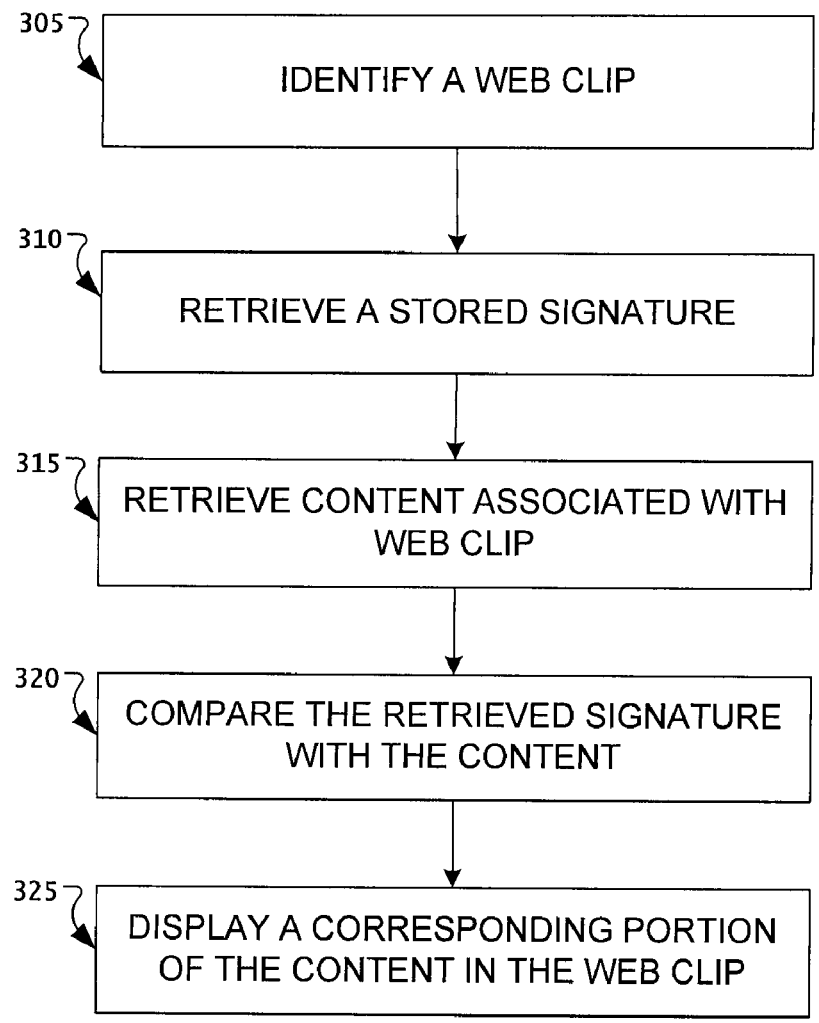
FIG. 3A is a flow chart showing an example process for displaying a portion of content using a signature.

FIG. 3A shows an example process 300 that can be used to locate and present originally targeted content using a signature generated by example process 200. Process 300 may be performed, at least in part, by, for example, clipping application 100.

Referring to FIG. 3A, process 300 includes identifying a web clip (305). The identification of a web clip may include identifying a clip containing, for example, the targeted content. Operation 305 may be performed either the clipping application 100 or by the user (e.g., by pointing a cursor over a desired web clip and manually selecting the web clip).

Process 300 includes retrieving a stored signature (310). The stored signature can be retrieved from a location that is designated for storing signatures. If process 200 has previously stored the signature in a transitory memory such as local cache or random access memory ("RAM"), then process 300 can access the local cache or RAM to retrieve the stored signature. Similarly, if process 200 has previously stored the signature in a non-transitory memory such as a hard disk, process 300 can access the hard disk to retrieve the stored signature. In some implementations, if more than one signature is stored, a user may manually identify and choose a signature that corresponds to the desired content for which a new location is to be tracked.

Process 300 includes retrieving content associated with a web clip (315). In some implementations, retrieving content associated with a web clip includes retrieving stored identifying information associated with the web clip. The identifying information may include the latest (or some other version, such as the original clipping) content retrieved from the area of interest. The identifying information also may include, for example, a uniform resource locator ("URL") of the one or more web pages, as well as additional information that might be required to locate and access the content in a selected area of interest.

In typical implementations, the clipping application 100 stores identifying information for a web clip as a non-transitory file. Thus, retrieving stored identifying information associated with the web clip may also include retrieving the non-transitory file. By storing the identifying information as a file, the clipping application 100 enables a user to close the web clip and later access the web clip without having to repeat the procedure for selecting content source and navigating to a desired area of interest within the source. Thus, when the user reopens a web clip, the clipping application 100 may use the identifying information to display the latest contents as well as to refresh those contents.

Process 300 includes comparing the retrieved signature (retrieved in operation 310) with the retrieved content (retrieved in operation 315) of the web clip (320). The comparison may include comparing, for example, physical information stored in the signature with each element in the content to locate a best matching element. For example, the comparison may evaluate a boundary (e.g., spatial extent), structure or layout of each element. The comparison also may consider properties of each element, such as, without limitation, tag name, attribute, class and/or ID of the element. Once a matching element(s) is are found, a portion of the content corresponding to the matching element can subsequently be displayed in the web clip (325).

In some implementations, retrieving content associated with a web clip (315) can include retrieving a DOM of the content. As discussed previously, as an object model, DOM identifies the interfaces and objects used to represent and manipulate a document, and the semantics of these interfaces and objects, including both behavior and attributes. Thus, retrieving the DOM may include retrieving a logical model that represents the structure, behavior and attributes of the content. Retrieving the DOM may further include retrieving hierarchical relationships and collaborations between the elements in the content (e.g., relationships between nodes)

Figure 3B:
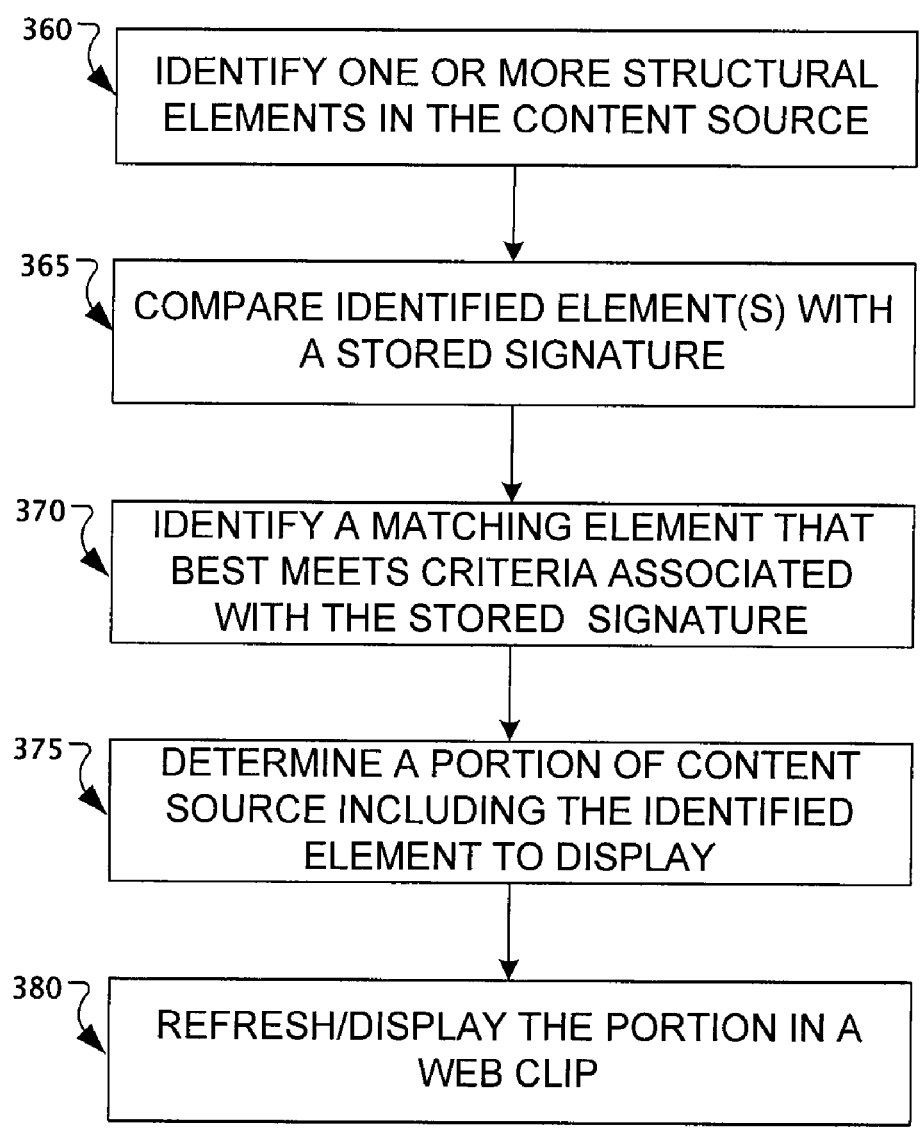
FIG. 3B is a flow chart showing an example process for determining a portion of content based on a document object model in conjunction with a signature.

In these implementations, comparing the retrieved signature with the content in the web clip (320) can include accessing a DOM of the content (e.g., retrieved in operation 315) and comparing nodes and subtree in the DOM with the stored signature in order to identify and locate a matching element(s). FIG. 3B shows an example process 350 that utilizes a DOM for comparing a retrieved signature with retrieved content associated with a web clip.

Referring to FIG. 3B, process 350 includes accessing a content source (355), and identifying one or more structural elements in the content source (360). In some implementations, operation 360 may be performed in a manner similar to operation 255.

Next, process 350 includes comparing the identified elements with a stored signature (365). Comparing the retrieved signature with the content in the web clip (320) can include accessing a DOM of the content (e.g., retrieved in operation 315) and comparing nodes and subtree in the DOM with the stored signature in order to identify and locate a matching element(s). In one implementation process 350 can utilize the comparison result to identify one matching element that best meets criteria associated with the stored signature (370).

In some implementations, identifying a matching element may include identifying a subtree/node match such that the match is identical to those defined in the signature. If there is no identical match, then identifying a matching element may include identifying a partial match that results in the maximum number of matching nodes and subtrees. Alternatively, identifying a matching element may include identifying a closest match where "closest" is defined with respect to a particular matching criterion or criteria designed to obtain a best matching element.

In some implementations, a matching algorithm can be implemented for comparing nodes and subtrees in the DOM with those defined in the signature based on a set of criteria. Nodes and subtrees in the DOM can be enumerated, evaluated and compared against those defined in the signature in any topological order. For example, nodes and subtrees in the DOM and in the signature can be compared in a bottom-up or top-down fashion.

The matching algorithm can determine a similarity between the nodes and subtrees in the DOM and those in the signature. For example, the similarity between any given subtree in the DOM and the signature can be determined based on best matches between corresponding nodes.

In some implementations, for each node encountered during traversal of a subtree, a weighted mechanism can be implemented that assigns a weighted value to each node. For example, a particular subtree in the DOM can be assigned a high weighted value when a number of nodes of a subtree in the DOM matches that of a subtree in the signature. Conversely, a particular subtree in the DOM with a large difference in an expected number of nodes can be assigned a low weighted value.

The matching algorithm also can employ predetermined criteria in assigning appropriate weighted values. For example, the matching algorithm can assign a high weighted value to a particular subtree in the DOM if its number of matching nodes reaches a predetermined threshold. As another example, the matching algorithm can increase an assigned weighted value to a subtree if its nodes and nodes of a given subtree in the signature have a same or substantially the same number of ancestors or decedents.

In some implementations, the matching algorithm can assign a high weighted value to a subtree in the DOM if its associated nodes and those in the signature are similar in nature (e.g., property, tag, attribute, class, ID, etc.). For example, when comparing subtrees, a node having a matching attribute "ID" can be given a high weighted value than a node that does not. In another implementations, a spectrum of weighted values can be given depending on particular types of matches. For example, a matching attribute, such as a matching tag name or matching ID, would receive a higher weighted value than a matching boundary size or dimension. As another example, other weighting schemes can be used (e.g., assigning low weights and matching to a lowest scored item).

Optionally, inherent similarity also may be used that takes into account of only the branch nodes without evaluating their child nodes. For example, if a particular branch node in the DOM is similar in nature to a branch node in the signature, it can be assumed that the children or leaf nodes rooted by the branch node are similar. Conversely, if a branch node in the DOM and a branch node in the signature are different, then it is likely that the children or leaf nodes thereof are not similar. In these implementations, only the branch nodes between the DOM and the signature are compared, while their leaf nodes can be omitted from comparison.

Weighted values for each node and subtree can be summed, and a particular element receiving a highest (or lowest in some paradigms) values can be selected as a matching element. Process 350 can determine a portion of the content source including the identified element (375), and refresh and display the portion in the web clip (380). In implementations in which a user may have clipped more than just a single element (e.g., 40 pixels×40 pixels more), process 350 can return and display this additional offset in addition to the portion of the content corresponding to the matching element. Similarly, in implementations in which a user may have clipped an area less than an element (e.g., 40 pixels×40 pixels less), process 350 can return and display a portion of the content corresponding to the matching element minus the offset. In some implementations, if a clipping includes a portion of an element and a portion of another element, process 350 can optionally determine a matching element based on, for example, the matching algorithm which evaluates the DOM information associated with the clipped portions of both elements, and use, for example, the size, boundary or other physical information of the matching element as an offset origin for determining the offset needed to include the non-selected element in the clipping.

A system, processes, applications, engines, methods and the like have been described above for generating a signature, using the signature for locating the targeted content in a refreshed web clip, and presenting the targeted content in an output device (e.g., a display). Web clips as described above are not limited to a single content source, and can be derived from more than one content source.

Web clips as well can be used in conjunction with one or more applications. The clipping application 100 can be a stand alone application, work with or be embedded in one or more individual applications, or be part of or accessed by an operating system. The clipping application 100 can be a tool called by an application, a user, automatically or otherwise to create, modify and present clippings.

The clipping application 100 described herein can be used to present clipped content in a plurality of display environments. Examples of display environments include a desktop environment, a dashboard environment, an on screen display environment, a mobile environment or other display environment.

Example Screenshots

FIGS. 4A-4D are example screenshots showing effects on a clipping without the application of a signature.

Figure 4A:
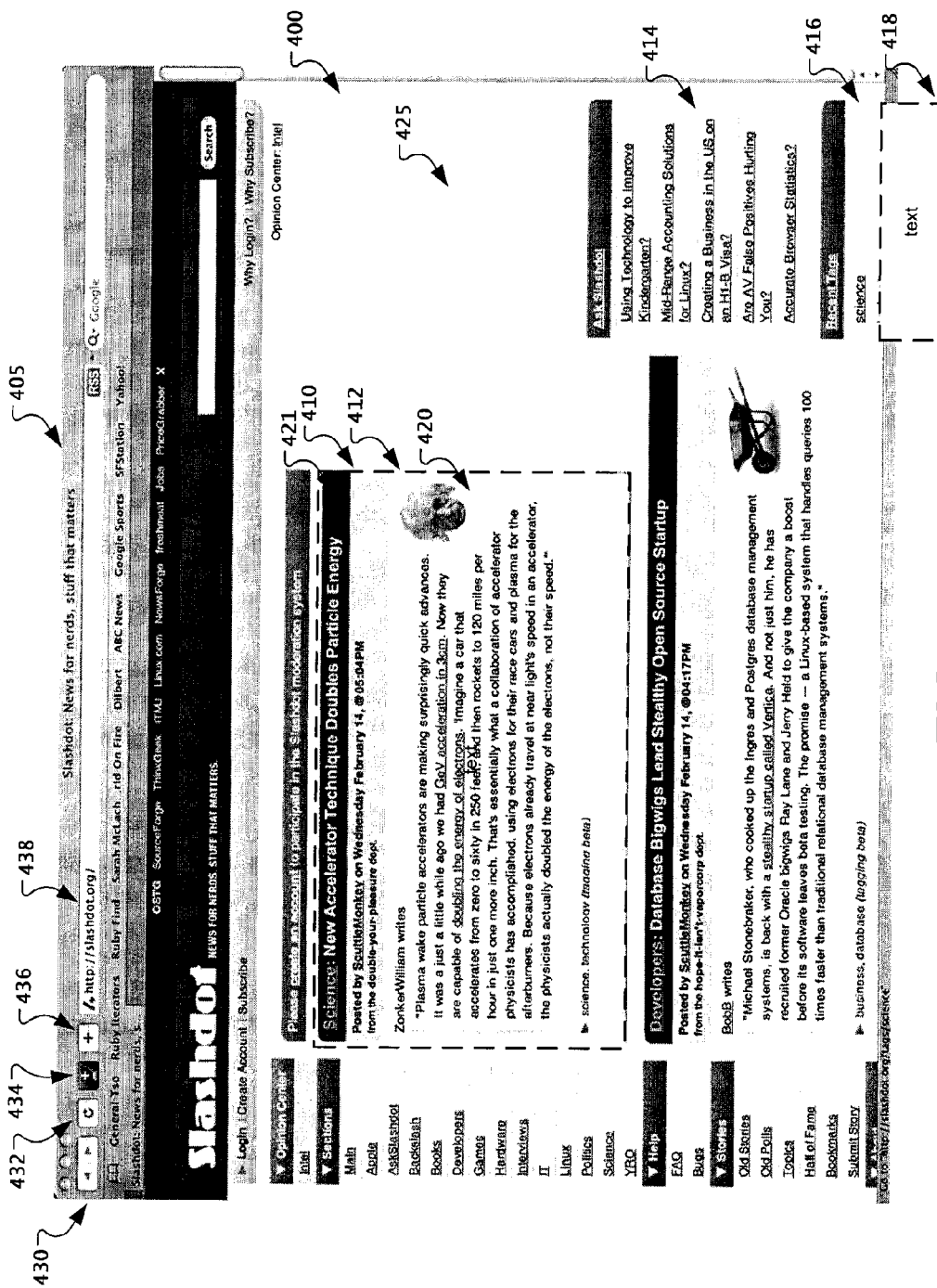
FIG. 4A is a screen shot showing content of a web page.

FIG. 4A is a screen shot showing content of a web page 400. Referring to FIG. 4, the web page 400 can be accessed from a browser 405, and the configuration of the browser 405 (e.g., size of the browser window) may affect how content from the web page 400 is actually displayed (e.g., page flow, line wrap, etc.), and therefore which content the user desires to have clipped. The web browser 405 is a Safari® application window, and the window contains a content display area 425 and a tool bar 430. The tool bar 430 can receive user input which, in general, affects the content displayed in the display area 425. A user can provide input using an input device, including a keyboard or keyboard pointer (e.g., a keyboard shortcut), a mouse, a trackball, a track-pad or a table (e.g., clicking on a button, performing an predetermined gesture, etc.), touch screen or other user manageable devices or navigation tools. The input device can generally control movement of a cursor in response to input received from the user.

The tool bar 430 includes user interface elements such as an address bar 438, a refresh button 432, a dashboard button 434 and a bookmark button 436. Receiving user input directed to one of the user interface elements in the tool bar 430 can affect how the content is displayed in the content display area 425. For example, a user can provide input to the address bar 438 that specifies a particular content source. The source can be provided as a Universal Resource Locator (URL). In the example shown, the address bar 438 contains 'http://www.slashdot.org/' specifying that the user is interested in the content provided by Apple®. In response, content from 'http://www.slashdot.org/' is loaded into the display area 425 (e.g., by the identification engine 110, the presentation engine 190 or in combination with one or more other engines as described in reference to FIG. 1). This is one of a number of possible starting points for creating clipped content as discussed above. Once a particular web page has been identified, the clipping application 100 can be initiated. Initiation can occur automatically, or by user prompt. Other means of initiating the clipping application are possible, including by an authoring application, by user interaction, by a call or the like as described above.

Content can be received from the location specified in the address bar 438, and encoded with information that describes the content and specifies how the content should be displayed. For example, content can be encoded using HTML, eXtensible Markup Language (XML), graphic image files (e.g., Graphic Interchange Format (GIF), Joint Photographic Expert Group (JPEG), etc.), or any other suitable encoding scheme. In general, a web browser, such as web browser 405, is capable of rendering the variety of content including files, images, sounds, web pages, RSS feeds, chat logs, email messages, video, three-dimensional models and the like.

Generally, once a clipping request is received, a user can manually and spatially define an area of interest 412 (e.g., a section of text, a portion of a rendered display, a length of sound, an excerpt of video, etc.) within the web page 400 that defines a particular portion(s) of content to be clipped. The web page 400 can include any content that can be captured and presented (e.g., a file containing images, text, graphics, music, sounds, videos, three-dimensional models, structured information, or input provided by external devices (e.g., digital camera, video camera, web cam, scanner, microphone, etc.).

Alternatively, the clipping application 100 may be launched to identify one or more potential areas of interest. Identifying one or more potential areas of interest may include identifying one or more structural elements within the web page 400. For example, the structure engine 140 can identify, in the web page 400, one or more elements (e.g., element 420) that may indicate a structural arrangement including text, a paragraph, a table, a portion of a table (e.g., cell, row or column), a chart or a graph. In the example shown, the element 420 encompasses an area of interest 412. The structure engine 140 also can identify structural elements having portions thereof not displayed within the display area 425 (e.g., structural element 416 includes a portion 418 not displayed within the display area 425, as shown by the phantom lines).

To identify structural elements, the structure engine 140 may access a DOM of the web page 400 to search for nodes/subtrees that represent content, structure, and style of the web page 400 (e.g., appearance and location of the web page 400), and to identify one or more objects that may indicate their structural characteristics. The structure engine 140 can subsequently identify, for example, a boundary (e.g., boundary 410), spatial extent (e.g., 640 pixels wide by 480 pixels high) and location or other information defining geographic coordinates (e.g., 40 pixels down and 40 pixels to the right from a reference point) of the elements.

In some implementations, all structural elements that have a physical layout in the selected content source can be identified. For example, in a web page, encoded in the Hypertext Markup Language (HTML) or eXtensible HTML (XHTML), all structural elements including document sections (e.g., delineated by the <DIV> tag), images, tables and table elements (e.g., individual rows, columns or cells within a table) can be detected and identified. In these implementations, the structure engine 140 can retrieve and analyze a DOM associated with the web page 400 to determine the usage of syntax elements (e.g., tags, attributes, anchors, links, frames, blocks and the like) that may indicate the existence of structural elements.

In some implementations, inline elements, which are typically elements that affect the presentation of a portion of text but do not denote a particular spatial dimension, can be ignored or omitted (i.e., not identified) during detection. In these implementations, any element that is not visible in the presentation of the web page also can be omitted from being identified.

Alternatively, inline elements can be used in identifying structural elements. For example, when an inline element implies a structure (e.g., an image delineated by an <img> tag) or when a particular inline element is identified as having a corresponding structure, such implicit or explicit structural designation can be used in categorizing the element as a structural element. For example, if the inline element is an anchor <a> tag used in a cascading style sheet (CSS) to style the element as a block, then the block is identified as a structural element by the structural element detection module 112. Other (e.g., HTML or XHTML) tag elements or criteria for use in identifying the structural elements also are contemplated.

Figure 4B:
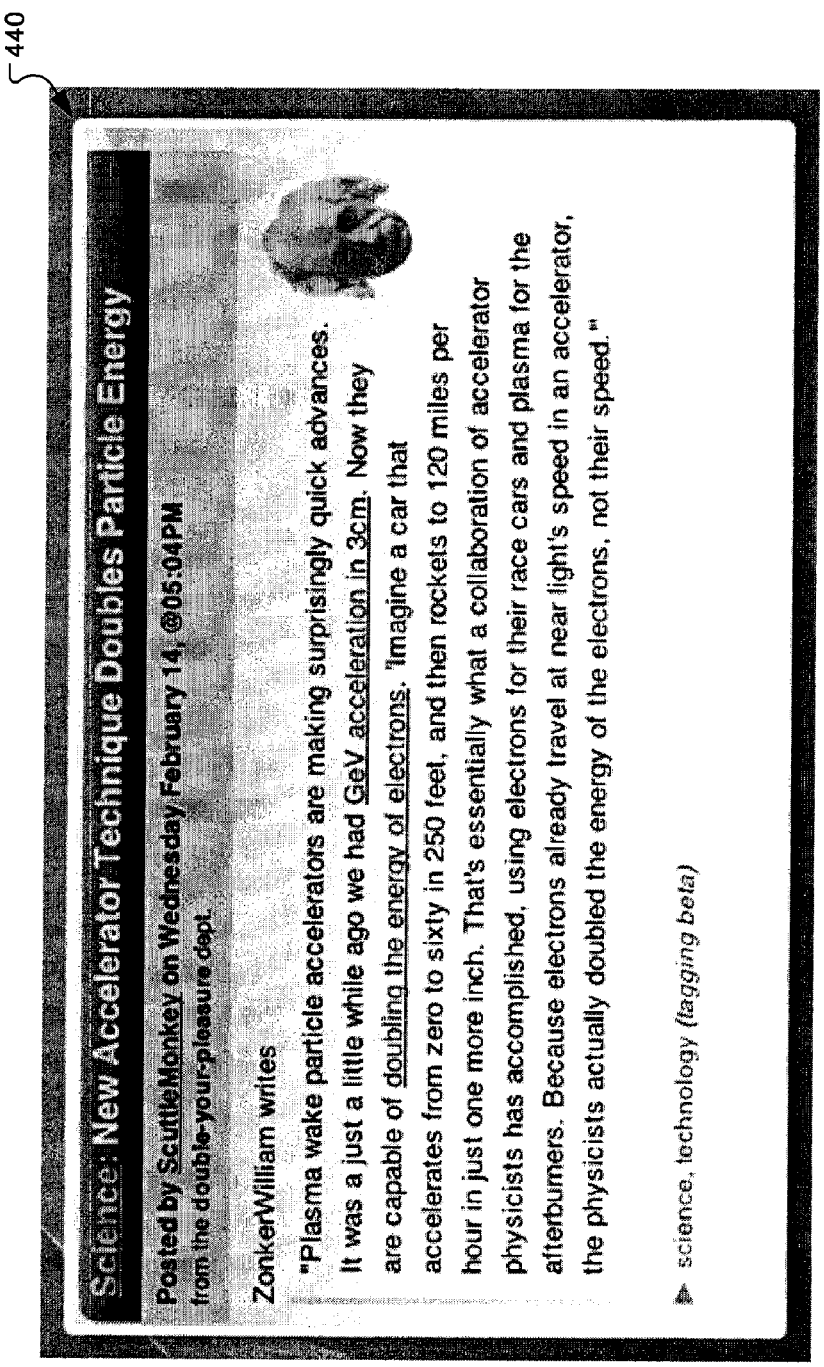
FIG. 4B is a screen shot showing a clipping created from a portion of a web page shown in FIG. 4A.

FIG. 4B is a screen shot showing a clipping 440 created from the web page 400. The clipping 440 depicts a comment blog (e.g., "Science: New Accelerator Technique Doubles Particle Energy") within the element 410 accessed from the source "http://www.slashdot.org".

Figure 4C:
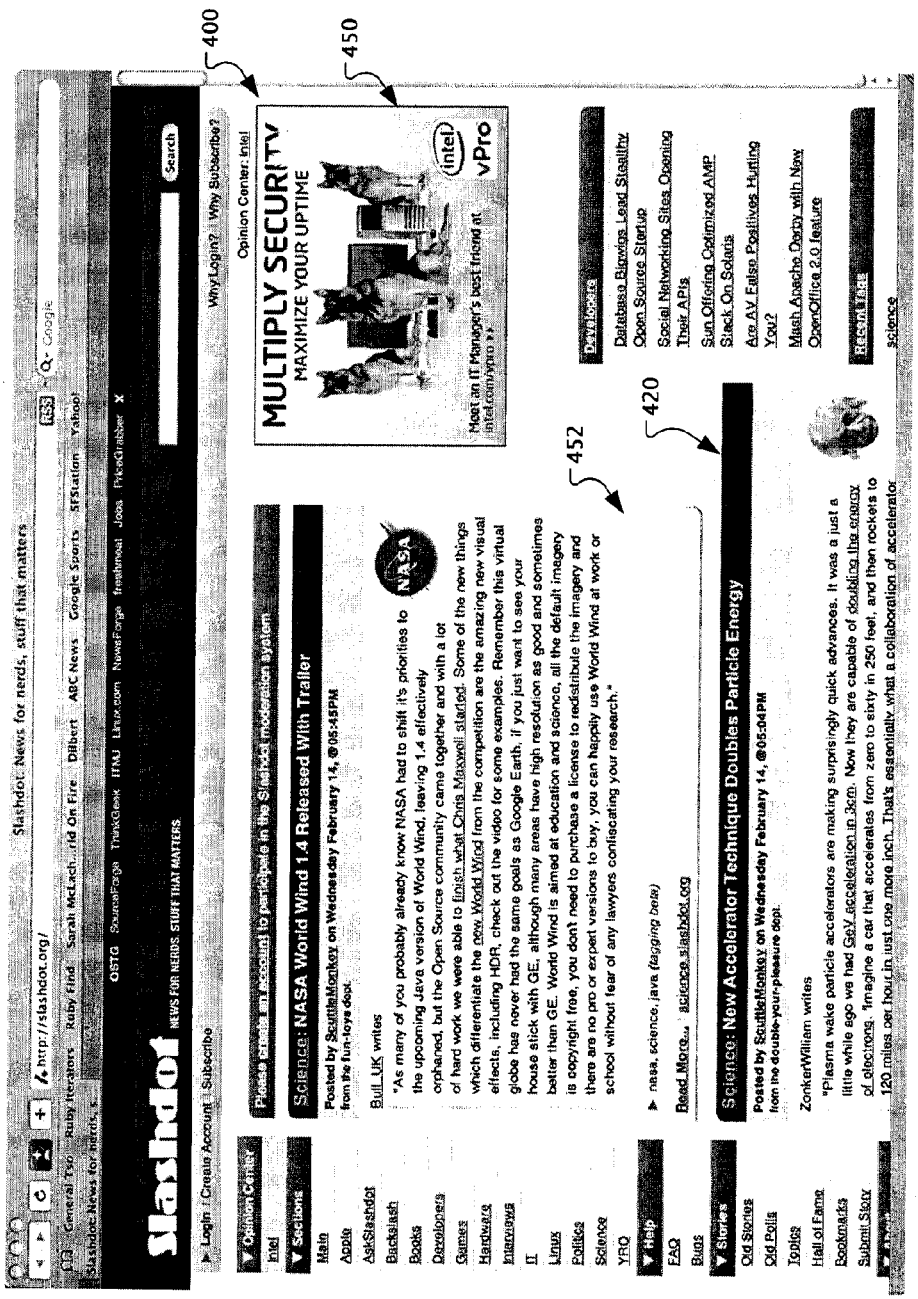
FIG. 4C is a screen shot showing a state of the web page shown in FIG. 4A after a refresh/update.

FIG. 4C is a screen shot showing content update/refresh of a web page 400 shown in FIG. 4A. An update/refresh may be executed in response to a refresh request. The refresh request may be received directly from a user, generated as a result of a timer set to initiate refresh requests at a particular frequency, or required in response to an indication from a content source or application that an update is available, required or otherwise 10 necessitated (e.g., live or automatic updates). A refresh request also may be received in response to receiving an update (rather than merely a notification of an available update) pushed from a content source. Other forms of refresh are also possible, including those associated with automatic refresh of the clipping, refreshes associated with live events, continuous updates, source updates, manual refresh requests, or other conventional forms of refresh.

Figure 4D:
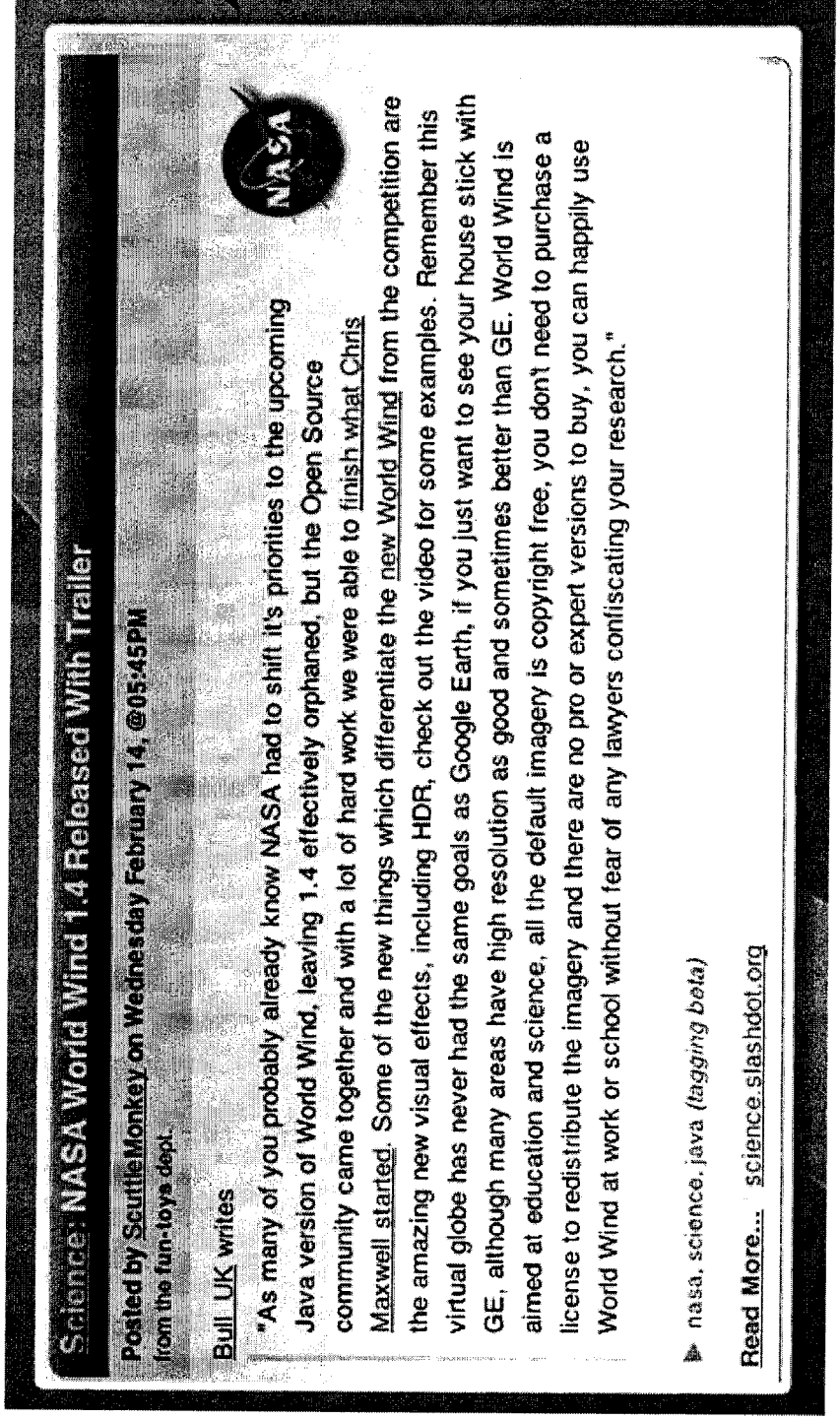
FIG. 4D is a screen shot showing a change to the clipping shown in FIG. 4B.

After refresh, additional materials are added into the web page 400. For example, an advertising banner 450 is rendered on a side of the web page 400, and a new comment blog "NASA World Wind 1.4 Released With Trailer" is inserted above the element 420. This insertion immediately causes a refresh of the content rendered in the clipping 440. As shown in FIG. 4D, the targeted comment blog (e.g., "Science: New Accelerator Technique Doubles Particle Energy") has now been replaced with the new comment blog "NASA World Wind 1.4 Released With Trailer", because the targeted comment blog was originally defined with respect to the selected area of interest 412. Thus, a change in the content within the selected area of interest 412 would also effectuate a change in the clipping 440, and the clipping 454 immediately reflects the content shown in the new comment blog "NASA World Wind 1.4 Released With Trailer".

Figure 4E:
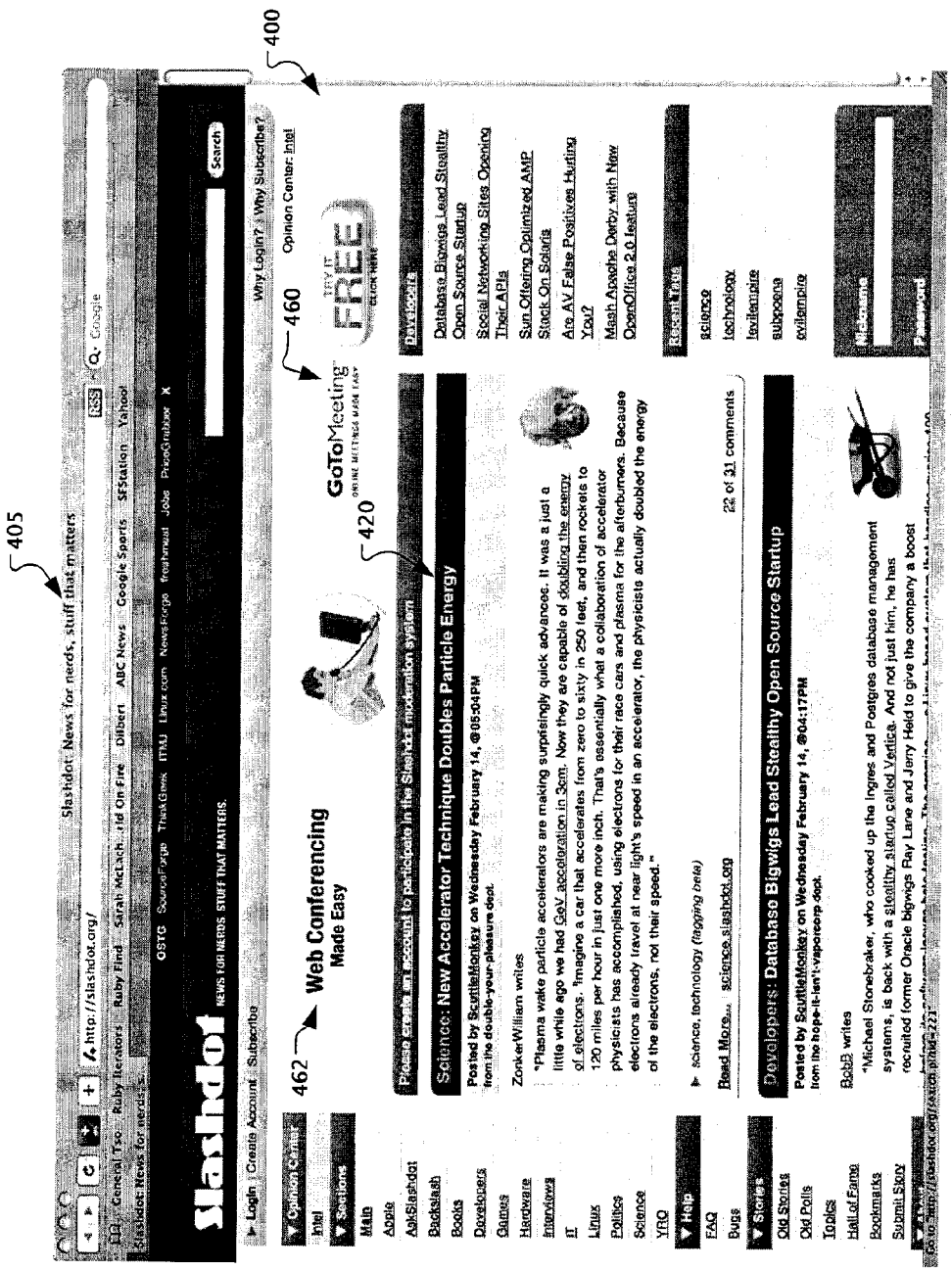
FIG. 4E is a screen shot showing a state of the web page shown in FIG. 4A after a refresh/update.
Figure 4F:
FIG. 4F is a screen shot showing a change to the clipping after a signature is applied.

FIGS. 4E-4F are example screenshots showing effects on a clipping with the application of a signature. FIG. 4E is a screen shot showing a state of the web page 400 shown in FIG. 4A after a refresh. The refresh may be issued, for example, as a result of receiving an update and a refresh command to the browser 405, causing the current web page to be reloaded.

As shown, after refresh, some of the content elements in the web page 400 have been modified, removed or added. For example, a side panel "Ask Slashdot" 414 shown in FIG. 4A has been removed as a result of an update to the web page 400. New content has been added to the web page 400 after refresh. The new content includes commercial and advertising banners 460/462 placed above the comment blog "Science: New Accelerator Technique Doubles Particle Energy" 420, and a side panel for "Developers" situated adjacent to the comment blog 420. The size of the element 420 also has been modified (e.g., a longer length).

Prior to refresh, a user may identify a structural element for which a signature is to be generated. Identifying a structural element may be performed by a user using a cursor. In the example shown, the user may simply select the element 420 to create a signature for the element 420. Alternatively, the clipping application 100 may automatically identify a structural element best match for a signature (e.g., by evaluating a DOM of the web page 400). A matching element(s) can be identified based on one or more criteria, such as, without limitation, a boundary, spatial extent of the boundary and visibility of the element. A matching element(s) also can be identified by applying a weighted mechanism to determine signature suitability of each element. Assuming that there are only two structural elements 416 and 420 in the web page 400 and element 416 has an overall weighted values lower than element 420, element 420 is selected as a matching element.

A signature that defines a matching element is then generated and stored. In the example shown, a signature can be created for the element 420, where the signature defines the characteristics of the element 420. For example, the signature may contain physical information such as, without limitation, a frame or border of the element (e.g., border 421), (x,y) coordinates of the element (e.g., 40 pixels down and 60 pixels to the right from a reference point), size or dimension of the element (e.g., 640×480 pixels), visibility of the element (e.g., 100% visibility within the display area 425), or DOM information such as, without limitation, tag name and attribute of the element, size of the element, number of parent and child nodes of the element, types and tag names of the parent and child nodes of the element, number of sibling nodes, types and tag names of the sibling nodes, and properties (e.g., class, ID, etc.) of the element and parent and child nodes of the element.

After refresh, the signature is retrieved and compared with elements in a content source. In the example shown, elements in the web page 400 can be compared against the information defined in the signature. For example, the boundary or location of each element is compared against that defined in the signature. As another example, a DOM of the updated web page 400 is parsed, and the signature is compared against the nodes and subtrees in the DOM. Once a matching element is found, a portion of the content corresponding to the matching element is rendered in the web clip. The content of the matching element is reflected in the clipping 470 shown in FIG. 4F.

Figure 5:
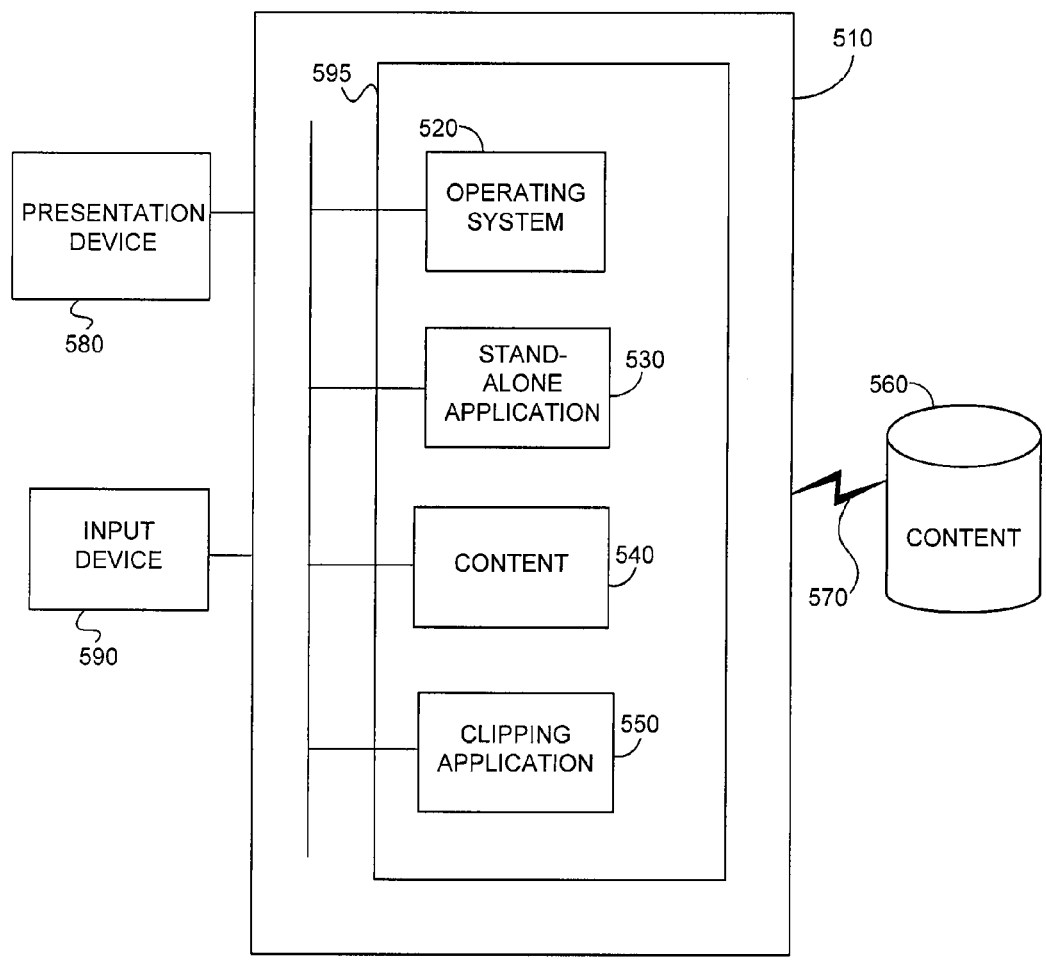
FIG. 5 is a block diagram showing a system for clipping content.

FIG. 5 is a block diagram showing a system for clipping content. Referring to FIG. 5, a system 500 is shown for clipping content and presenting the clippings (or sometimes referred below as a clipview, webview, or other "X"views) to a user. System 500 includes a processing device 510 having an operating system 520, a stand-alone application 530, a content source 540, and a clipping application 550. Each of elements 520-550 is communicatively coupled, either directly or indirectly, to each other. Elements 520-550 are stored on a memory structure 595, such as, for example, a hard drive. System 500 also includes a presentation device 580 and an input device 590, both of which are communicatively coupled to processing device 510. System 500 further includes a content source 560 external to processing device 510, and communicatively coupled to processing device 510 over a connection 570.

Processing device 510 may include, for example, a computer, a gaming device, a messaging device, a cell phone, a set top box, a television set, a personal/portable digital assistant ("PDA"), or an embedded device. Operating system 520 may include, for example, MAC OS X from Apple Computer, Inc. of Cupertino, Calif. Stand-alone application 530 may include, for example, a browser, a word processing application, a database application, an image processing application, a video processing application or other application. Content source 540 and content source 560 may each include, for example, a document having any of a variety of formats, files, pages, media, or other content, and content sources 540 and 560 may be compatible with stand-alone application 530. Presentation device 580 may include, for example, a display, a computer monitor, a television screen, a speaker or other output device. Input device 590 may include, for example, a keyboard, a mouse, a microphone, a touch-screen, a remote control device, a speech activation device, or a speech recognition device or other input devices. Presentation device 580 or input device 590 may require drivers, and the drivers may be, for example, integral to operating system 520 or stand-alone drivers. Connection 570 may include, for example, a simple wired connection to a device such as an external hard disk, or a network, such as, for example, the Internet. Clipping application 550 as described in the preceding sections may be a stand-alone application as shown in system 500 or may be, for example, integrated in whole or part into operating system 520 or stand-alone application 530.

Processing device 510 may include, for example, a mainframe computer system, a personal computer, a personal digital assistant ("PDA"), a game device, a telephone, a presentation or a messaging device. The term "processing device" may also refer to a processor, such as, for example, a microprocessor, an integrated circuit, or a programmable logic device. Content sources 540 and 570 may represent, or include, a variety of non-volatile or volatile memory structures, such as, for example, a hard disk, a flash memory, a compact diskette, a random access memory, and a read-only memory.

Implementations may include one or more devices configured to perform one or more processes. A device may include, for example, discrete or integrated hardware, firmware, and software. Implementations also may be embodied in a device, such as, for example, a memory structure as described above, that includes one or more computer readable media having instructions for carrying out one or more processes. The computer readable media may include, for example, magnetic or optically-readable media, and formatted electromagnetic waves encoding or transmitting instructions. Instructions may be, for example, in hardware, firmware, software, or in an electromagnetic wave. A processing device may include a device configured to carry out a process, or a device including computer readable media having instructions for carrying out a process.

While the above implementations have been described with respect to clipping content, it should be noted that these implementations also can be applied to various applications, such as, but not limited to, selecting one or more areas of a page to print, selecting areas of a page to copy, or selecting areas of edible HTML content to delete. Also, it is to be appreciated that the signature generation discussed above is not limited to document object mode, and also can be used with these object models.

Also, it will be understood that various modifications may be made. For example, elements of one or more implementations may be combined, deleted, modified, or supplemented to form further implementations. Additionally, in further implementations, an engine 110-190 need not perform all, or any, of the functionality attributed to that engine in the implementations described above, and all or part of the functionality attributed to one engine 110-190 may be performed by another engine, another additional module, or not performed at all.

A system, processes, applications, engines, methods and the like have been described above for clipping and presenting content associated with an area of interest from one or more content sources and presenting the clippings in an output device (e.g., a display). The content source may include an unshared or shared document or other file. Such documents may include, for example, a document from a standard business application as described earlier, a drawing, a figure, or a design schematic.

The content source may include a view of a folder, a volume, a disk, a Finder window in MAC OS X, or some other description of the contents of a storage area (either physical or virtual, for example). One folder may be a smart folder, such as a drop box, that receives documents ready for publication. The content source also may include a view of a search window that may display, for example, all documents related to a particular project. The search window, and a clipping of the search window, may automatically update when a new document or item matching the search criteria appears.

The content source may include television, video, music, radio, movies, or flash content. The content source also may include a media player presentation.

The content source may include information from a game, including both single player and multiple player games. For example, a clipping may show a view of some portion of a game in progress or of a summary of a game in progress. For example, a user may be waiting on an adversary's next chess move and may have a clipping showing the chess board, showing an indicator of whose turn it is, or showing a timer indicating how much time is left in the adversary's turn.

The content source may include a portion of a user interface for an application. For example, a user may clip a view of a dialog box for a command that requires four menu selections to view when using the application's user interface. The clipping may allow the user to select the command. When the user selects the command within the clipping, the clipping may close just as the dialog box would if the command were selected in the usual manner, or the clipping may remain active to allow the user to select the command multiple times. Such clippings may serve as macros or shortcuts, allowing the user to effectively redefine the user interface for the application. Such redefinitions of the user interface may be particularly useful because the clipping includes a visual display.

Accordingly, other implementations are within the scope of the following claims.

What is claimed is:

1. A method executed by one or more computers, the method comprising:
   receiving a request to display a portion of a document, the portion of the document being associated with a signature;
   retrieving an updated version of the document, the document being compliant with a document object model and having one or more nodes and subtrees in accordance with the document object model;
   determining a portion of the updated version of the document that corresponds to the signature, including:
      comparing the nodes and subtrees with the signature; and
      identifying the portion of the updated version of the document based on the comparison; and
   providing the portion of the updated version of the document for display in a user interface.

2. The method of claim 1, further comprising determining one or more key elements in the portion of the document and determining the signature, where determining the signature includes determining a signature that defines the key elements.

3. A method executed by one or more computers, the method comprising:
   receiving a request to display a portion of a document, the portion of the document being associated with a signature, the signature stored on a storage device;
   retrieving the signature from the storage device, including identifying a key element in the signature;
   determining a portion of an updated version of the document, including:
      comparing the key element to elements in the updated version of the document; and
      locating a corresponding key element in the updated version of the document based on the comparing; and
   providing the portion of the updated version of the document for display, including providing the corresponding key element in the portion of the updated version of the document for display in a user interface.

4. The method of claim 3, where displaying the corresponding key element in the portion includes:
   determining an offset between the key element in the document and the corresponding key element in the updated version of the document; and
   providing for display the corresponding key element with the offset.

5. A method executed by one or more computers, comprising:
   receiving a request to display a portion of a document, the portion of the document being associated with a signature, the signature being stored on a storage device and determined using operations including:
      identifying a portion of a structure of the document, including:
         identifying a structure of the document;
         identifying one or more structural elements in the structure; and
         selecting at least one identified structural element as a matching element; and
      determining the signature that defines the matching element;
   retrieving the signature;
   retrieving an updated version of the document;
   identifying one or more structural elements in the updated version of the document;

comparing the matching element to the one or more structural elements in the updated version of the document;
locating a corresponding matching element in the updated version of the document based on the comparing; and
providing the corresponding matching element for display in a user interface.

6. The method of claim 5, where the document includes a web page.

7. The method of claim 6, where the portion of the document includes a selected area of interest.

8. A method executed by one or more computers, comprising:
identifying a portion of a structure of a document, including identifying the structure of the document and identifying one or more structural elements in the structure, where identifying the one or more structural elements in the structure includes:
assigning one or more weighted values to each structural element based on one or more conditions, the weighted values indicating a rank relative to other structural elements, wherein the conditions include at least one of a boundary size, a spatial extent, or a visible region of a respective structural element;
generating a score for the each structural element based on the assigned one or more weighted values; and
selecting a structural element having a predetermined threshold as a matching element;
determining a signature associated with the portion, including determining a signature for the matching element; and
storing the signature on a storage device.

9. The method of claim 8, where identifying the one or more structural elements in the structure of the document includes determining a boundary associated with the each structural element and selecting a structural element that meets a predetermined boundary criterion.

10. The method of claim 8, where identifying the one or more structural elements in the structure includes:
determining a spatial extent of a boundary associated with the each structural element and selecting a structural element that meets a predetermined spatial extent criterion.

11. The method of claim 8, where identifying the one or more structural elements in the structure includes:
determining a visible region associated with each structural element and selecting a structural element that meets a predetermined visibility criterion.

12. The method of claim 8, further comprising:
receiving a request to display a portion of the document;
retrieving the signature;
retrieving an updated version of the document;
determining a portion of the updated version of the document that corresponds to the signature; and
presenting the portion from the updated version of the document in a user interface.

13. The method of claim 8, wherein the signature includes physical information associated with the portion of the structure of the document.

14. The method of claim 8, where identifying the portion of a structure of a document includes identifying one or more elements that indicate the presence of the structure.

15. The method of claim 14, wherein the structure includes at least one of a document section, table, graph, chart or image.

16. The method of claim 8, where identifying one or more structural elements in the structure includes retrieving structural information from a document object model associated with the document.

17. The method of claim 8, where the predetermined threshold is based on one of a predetermined boundary criterion, a predetermined spatial extent criterion, or a predetermined visibility criterion.

18. A non-transitory memory device storing instructions that are executable by a processing device, and upon such execution cause the processing device to perform operations comprising:
receiving a request to display a portion of a document, the portion of the document being associated with a signature, the signature being stored on a storage device and determined using operations including:
identifying a portion of a structure of the document, including:
identifying a structure of the document;
identifying one or more structural elements in the structure; and
selecting at least one identified structural element as a matching element; and
determining the signature that defines the matching element;
retrieving the signature;
retrieving an updated version of the document;
identifying one or more structural elements in the updated version of the document;
comparing the matching element to the one or more structural elements in the updated version of the document;
locating a corresponding matching element in the updated version of the document based on the comparing; and
providing the corresponding matching element for display in a user interface.

19. A non-transitory memory device storing instructions that are executable by a processing device, and upon such execution cause the processing device to perform operations comprising:
identifying a portion of a structure of a document, including identifying the structure of the document and identifying one or more structural elements in the structure, where identifying the one or more structural elements in the structure includes:
assigning one or more weighted values to each structural element based on one or more conditions, the weighted values indicating a rank relative to other structural elements, wherein the conditions include at least one of a boundary size, a spatial extent, or a visible region of a respective structural element;
generating a score for the each structural element based on the assigned one or more weighted values; and
selecting a structural element having a predetermined score as a matching element;
determining a signature associated with the portion, including determining a signature for the matching element; and
storing the signature on a storage device.

20. A system, comprising:
one or more computers configured to perform operations comprising:
receiving a request to display a portion of a document, the portion of the document being associated with a signature;
retrieving an updated version of the document, the document being compliant with a document object model and having one or more nodes and subtrees according to the document object model;
determining a portion of the updated version of the document that corresponds to the signature, including:
comparing the nodes and subtrees with the signature; and
identifying the portion of the updated version of the document based on the comparison; and
providing the portion of the updated version of the document for display in a user interface.

* * * * *

UNITED STATES PATENT AND TRADEMARK OFFICE
CERTIFICATE OF CORRECTION

| | | |
|---|---|---|
| PATENT NO. | : 7,917,846 B2 | Page 1 of 1 |
| APPLICATION NO. | : 11/760650 | |
| DATED | : March 29, 2011 | |
| INVENTOR(S) | : Decker et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 747 days.

Signed and Sealed this
Fourth Day of October, 2011

David J. Kappos
*Director of the United States Patent and Trademark Office*

UNITED STATES PATENT AND TRADEMARK OFFICE
CERTIFICATE OF CORRECTION

PATENT NO.         : 7,917,846 B2                                     Page 1 of 1
APPLICATION NO.    : 11/760650
DATED              : March 29, 2011
INVENTOR(S)        : Decker et al.

It is certified that error appears in the above-identified patent and that said Letters Patent is hereby corrected as shown below:

ON THE TITLE PAGE:

In column 2, under "Other Publications", lines 21-24, delete "Apple Inc.: "Dashboard—Clips and Flicks" [Online] May 25, 2007, pp. 1-3, XP002491369 Retrieved from the internet: URL:http://web.archive.org/web/20070525170126/www.apple.com/macosx/leopard/dashboard.html>; [retrieved on May 25, 2007]." and insert the same as a new entry.

IN THE SPECIFICATIONS:

In column 2, line 53, delete "position" and insert -- positioned --, therefor.

In column 16, line 45, after "nodes)" insert -- . --.

In column 18, line 62, delete "an" and insert -- a --, therefor.

In column 20, lines 47-48, after "otherwise" delete "10".

In column 22, line 2, delete ""X"Views)" and insert -- "X" views) --, therefor.

Signed and Sealed this
Twenty-ninth Day of November, 2011

David J. Kappos
*Director of the United States Patent and Trademark Office*